United States Patent
Cowtan et al.

(10) Patent No.: US 11,144,689 B1
(45) Date of Patent: Oct. 12, 2021

(54) SYSTEM AND METHOD FOR GENERATING A QUANTUM CIRCUIT

(71) Applicant: Cambridge Quantum Computing Limited, London (GB)

(72) Inventors: Alexander Cowtan, Glasgow (GB); Ross William Duncan, Cambridge (GB); William Victor Simmons, Cambridge (GB)

(73) Assignee: CAMBRIDGE QUANTUM COMPUTING LIMITED, London (GB)

( * ) Notice: Subject to any disclaimer, the term of this patent is extended or adjusted under 35 U.S.C. 154(b) by 0 days.

(21) Appl. No.: 16/848,530

(22) Filed: Apr. 14, 2020

(51) Int. Cl.
- *G06F 30/323* (2020.01)
- *G06F 30/327* (2020.01)
- *G06N 10/00* (2019.01)
- *G06F 111/10* (2020.01)

(52) U.S. Cl.
CPC .......... *G06F 30/323* (2020.01); *G06F 30/327* (2020.01); *G06N 10/00* (2019.01); *G06F 2111/10* (2020.01)

(58) Field of Classification Search
USPC ........................................................ 716/103
See application file for complete search history.

(56) References Cited

U.S. PATENT DOCUMENTS

| | | | | |
|---|---|---|---|---|
| 2018/0032894 | A1* | 2/2018 | Epstein | G06N 10/00 |
| 2020/0104740 | A1* | 4/2020 | Cao | G06F 15/16 |

OTHER PUBLICATIONS

Van der Berg, et al.; "Circuit optimization of Hamiltonian simulation by simultaneous diagonalization of Pauli clusters"; Mar. 30, 2020; 26 Pages.

Aaronson et al., "Improved Simulation of Stabilizer Circuits", University of California, Berkeley, arXiv:quaint-ph/0406196v1; Jun. 25, 2004; 20 Pages.

Amy et al., "A Meet-In-The-Middle Algorithm for First Synthesis of Depth-Optimal Quantum Circuits", Institute for Quantum Computing, Waterloo, Ontario, Canada; Jan. 25, 2013; 23 Pages.

Amy et al., "On the CNOT-Complexity of CNOT-Phase Circuits", Institute for Quantum Computing, University of Waterloo, Canada, arXiv:1712.01859v2 [quant-ph]; Aug. 13, 2018; 21 Pages.

(Continued)

*Primary Examiner* — Bryce M Aisaka
(74) *Attorney, Agent, or Firm* — Daly, Crowley, Mofford & Durkee, LLP

(57) ABSTRACT

Concepts, systems and methods are described for generating a quantum circuit from a Unitary Coupled Cluster (UCC) ansatz which represents the excitation of a reference state by a parameterised operator including excitation operators. The UCC ansatz includes multi-qubit Pauli operators, referred to as Pauli strings, determined from each excitation operator. The method comprises partitioning the Pauli strings into mutually commuting sets and sequencing the Pauli strings by set. Pauli gadgets are then generated from the Pauli strings by Trotterization, the Pauli gadgets having the same sequencing by set as the Pauli strings. Each set of Pauli gadgets is diagonalised to convert the Pauli gadgets into phase gadgets which are then transformed into one- and two-qubit native gates to generate the quantum circuit.

19 Claims, 25 Drawing Sheets

(56) References Cited

OTHER PUBLICATIONS

Amy et al., "Polynomial-Time T-Depth Optimization of Clifford+T Circuits via Matroid Partitioning", Department of Computer Science, University of Toronto, Toronto, Ontario, Canada; Dec. 13, 2013; 25 Pages.
Amy et al., "Staq-A Full-Stack Quantum Processing Toolkit", SoftwareQ Inc., Kitchener, Ontario, Canada; Dec. 11, 2019; 21 Pages.
Arute et al., "Quantum Supremacy Using a Programmable Superconducting Processor", Nature, vol. 574, https://doi.org/10.1038/s41586-019-1666-5; Published Oct. 23, 2019; 7 Pages.
Beaudrap et al., Techniques to Reduce tt/4-Parity-Phase Circuits, Motivated by The ZX Calculus, department of Computer Science, University of Oxford, Oxford, United Kingdom, [arXiv:1911.09039v1 [quant-ph]; Nov. 20, 2019; 19 Pages.
Cambridge Quantum Computing; "Pytket"; Jan. 2020; 5 Pages.
Carlisle et al., "On the K-Coloring of Intervals", Discrete Applied Mathematics, vol. 59, pp. 225-235, Jan. 1995; 11 Pages.
Childs et al., "A Theory of Trotter Error", Department of Computer Science, University of Maryland; Dec. 18, 2019; 1 of 2; 34 Pages.
Childs et al., "A Theory of Trotter Error", Department of Computer Science, University of Maryland; Dec. 18, 2019; 2 of 2; 43 Pages.
Childs et al., "Circuit Transformations for Quantum Architectures", Joint Center for Quantum Information and Computer Science, University of Maryland; Jun. 3, 2019; 24 Pages.
Coecke et al., "Interacting Quantum Observables: Categorical Algebra and Diagrammatics", New Journal of Physics, vol. 13; Apr. 14, 2011; 86 Pages.
Coecke et al., "Picturing Quantum Processes", Cambridge University Press, Cambridge University, Cambridge, CB2 8BS, United Kingdom, Jan. 2017; 34 Pages.
"Coloring" https://network.github.io/documentation/stable/reference/algorithms.coloring.greedy_color.html, 1 Page.
Cowtan et al., "On the Qubit Routing Problem", Cambridge Quantum Computing Ltd., Cambridge, United Kingdom, Feb. 21, 2019; 32 Pages.
Cowtan et al., "Phase Gadget Synthesis for Shallow Circuits", Quantum Physics and Logic, Cambridge Quantum Computing Ltd., Cambridge, United Kingdom, Jan. 2019; 16 Pages.
Crawford et al., "Efficient Quantum Measurement of Pauli Operators", Rivertone, Cambridge, United Kingdom, [arXiv:1908.06942v1 [quant-ph], Aug. 19, 2019; 15 Pages.
Dean et al., "Coupled Cluster Approach to nuclear Physics", Physics Division, Oak Ridge National Laboratory, Aug. 29, 2003; 15 Pages.
Fagan et al., "Optimizing Clifford Circuits with Quantomatic", Department of Computer and Information Sciences, 15$^{th}$ International Conference on Quantum Physics and Logic, Jan. 2018; 21 Pages.
Farhi et al., "A Quantum Approximate Optimization Algorithm Applied to a Bounded Occurrence Constraint Problem", Center for Theoretical Physics, Massachusetts institute of Technology, Cambridge, MA, [arXiv:1412.6062v2 [quant-ph], Jun. 25, 2015; 13 Pages.
Gui et al. "Term Grouping and Traveling Salesperson for Digital Quantum Simulation", Pritzker School of Molecular Engineering, University of Chicago, Jan. 17, 2020; 17 Pages.
Hadfield et al, "From the Quantum Approximate Optimization Algorithm to A Quantum Alternating Operator Ansatz"; Quantum Artificial Intelligence Laboratory (QuAIL), NASA Ames Research Center; Feb. 28, 2019; 51 Pages.
Hastings et al. "Improving Quantum Algorithms for Quantum Chemistry" Quantum Architecture and Computation Group, Microsoft Research, arXiv:1403.1539v1 [quant-ph]; Mar. 6, 2014; 12 Pages.
Jena et al., "Pauli Partitioning with Respect to Gate Sets" Department of Combinatorics and Optimization and the Institute for Quantum Computing, University of Waterloo; arXiv:1907.07859v1 [quant-ph]; Jul. 18, 2019; 7 Pages.

Kandala et al., "Hardware-Efficient Variational Quantum Eigensolver for Small Molecules and Quantum Magnets", IBM T.J. Watson Research Center, Yorktown, Heights; Oct. 16, 2017; 24 Pages.
Kehrein et al., "Theory of the Anderson impurity Model: The Schrieffer-Wolff Transformation Re-Examined", Institut for Theoretische Physik, Germany; Oct. 5, 1995; 31 Pages.
Kissinger et al., "CNOT Circuit Extraction for Topologically-Constrained Quantum Memories", iCIS, Radboud University; Apr. 1, 2019; 13 Pages.
Kissinger et al., "Reducing T-Count with the ZX-Calculus", Radboud University Nijmegen, Mar. 25, 2019; 17 Pages.
Kliuchnikov et al., "Optimization of Clifford Circuits" Institute for Quantum Computing, University of Waterloo, Waterloo, Ontario, Canada, May 3, 2013; 7 Pages.
Lao et al., "Mapping of Quantum Circuits onto NISQ Superconducting Processors", Aug. 12, 2019; 17 Pages.
Lee et al., "Generalized Unitary Coupled Cluster Wavefunctions for Quantum Computation", Department of Chemistry, University of California; Oct. 4, 2018; 44 Pages.
Litinski, "Magic State Distillation: Not as Costly as You Think", Dahlem Center for Complex Quantum Systems, Freie Universitat, Berlin; Nov. 6, 2019; 22 Pages.
Lloyd, "Universal Quantum Simulators", Science, New Series, vol. 273, No. 5278; pp. 1073-1078; Aug. 23, 1996; 7 Pages.
Maslov et al. "Shorter Stabilizer Circuits Via Bruhat Decomposition and Quantum Circuit Transformations", Jun. 23, 2018; 10 Pages.
McClean et al., "The Theory of Variational Hybrid Quantum-Classical Algorithms", New Journal of Physics, Feb. 5, 2016, vol. 18; 23 Pages.
Nam et al., "Automated Optimization of Large Quantum Circuits with Continuous Parameters", Quantum Information, May 10, 2018, vol. 4, p. 23; 12 Pages.
Nam et al., "Ground-State Energy Estimation of the Water Molecule on a Trapped ION Quantum Computer", IonQ, Inc. College Park, MD, Mar. 7, 2019; 14 Pages.
Nash et al. "Quantum Circuit Optimizations for NISQ Architectures", Department of Physics, Massachusetts Institute of Technology, Cambridge, MA, Apr. 24, 2020; 11 Pages.
"NetworkAlgorithms.Coloring.Greedy_Color" https://networkx.github.io/documentation/stable/reference/algorithms/generated/networkx.algorithms.coloring.greedy_color.html, Aug. 22, 2020; 2 Pages.
Preskill, "Quantum Computing in the NISq Era and Beyond", Institute for Quantum Information and Matter and Walter Burke Institute for Theoretical Physics, California Institute of Technology; Jul. 30, 2018; 20 Pages.
Qiskit, "Open-Source Quantum Development", https://qiskit.org; 4 Pages.
QuanSys Inc.; "Algorithms"; Quantaggle, https://quantaggle.com/algorithms/algorithm/#VQE; 3 Pages.
QuanSys Inc.; "Ansatz Algorithm"; Quantaggle, https://quantaggle.com/algorithms/ansatz/#UCC;2 Pages.
Ramadhan "Nonlinear Optics Presentation"; University of Waterloo, Mar. 22, 2016; 37 Pages.
Romero et al. "Strategies for Quantum Computing Molecular Energies Using the Unitary Coupled Cluster Ansatz", Department of Chemistry ad Chemistry Biology, Harvard University, Feb. 10, 2018; 18 Pages.
Rungger et al., "Dynamical Mean Field Theory Algorithm and Experiment on Quantum Computers", National Physical Laboratory, United Kingdom; Jan. 8, 2020; 15 Pages.
Scalettar et al., "An Introduction to the Hubbard Hamiltonian", Department of Physics, University of California, Davis, Jul. 2016; 30 Pages.
Steudtner et al., "Fermion-to-Qubit Mappings with Varying Recourse Requirements for Quantum Simulation", New Journal of Physics; vol. 20, Jun. 7, 2018; 26 Pages.
Wecker et al., "Progress Towards Practical Quantum Variational Algorithms", Physical Review vol. 92; Oct. 2, 2015; 10 Pages.
Wikipedia; "Basis Set (Chemistry)", https://en.wikipedia.org/wiki/Basis_set_%28chemistry%29; 9 Pages.
Wikipedia; "Clifford Gates", https://en.wikipedia.org/wiki/Clifford_gates; 3 Pages.

(56) References Cited

OTHER PUBLICATIONS

Wikipedia; "Pauli Matrices", https://en.wikipedia.org/wiki/Pauli_matrices; 8 Pages.
Wright et al., "Benchmarking an 11-Qubit Quantum Computer", IonQ, Inc., College Park, MD, Mar. 19, 2019; 8 Pages.
Wu et al., "Optimization of CNOT Circuits on Topological Superconducting Processors", Institute of Computing Technology, CAS, Beijing, China, Oct. 31, 2019; 12 Pages.
Zhao et al., "Measurement Reduction in Variational Quantum Algorithms", Center for Quantum Information and Control, Department of Physics and Astronomy; Jun. 23, 2020; 21 Pages.
Zulehner et al., "An Efficient Methodology for Mapping Quantum Circuits to the IBM QX Architectures", Jun. 7, 2018; 11 Pages.

* cited by examiner

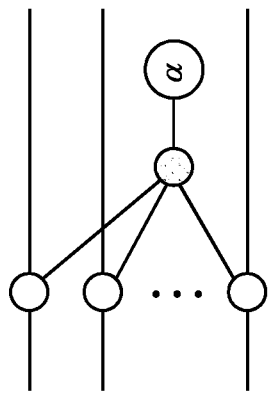
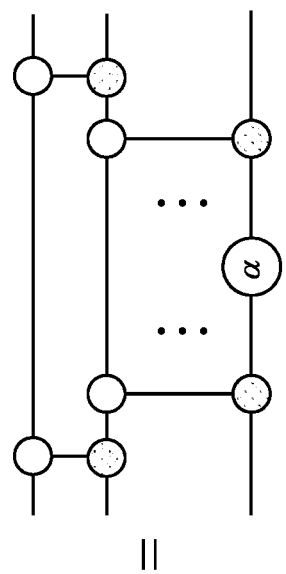
FIG. 2A (a) A valid two-qubit chain.

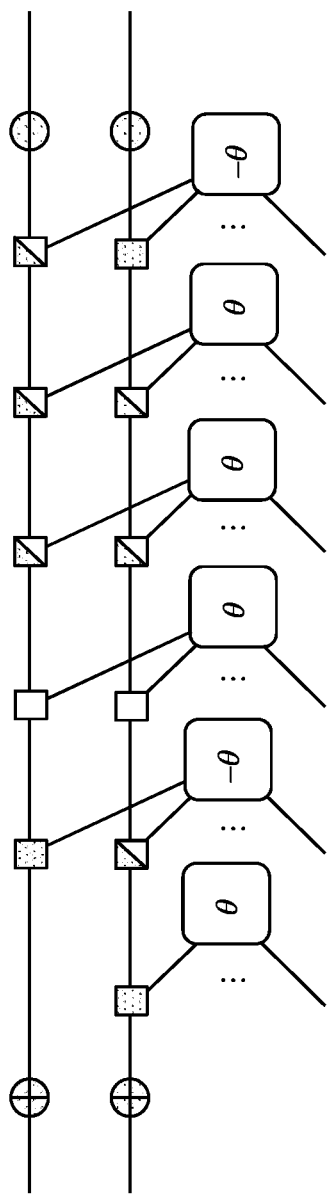
(b) Conjugation with appropriate single-qubit Cliffords.
FIG. 3 (cont. i)

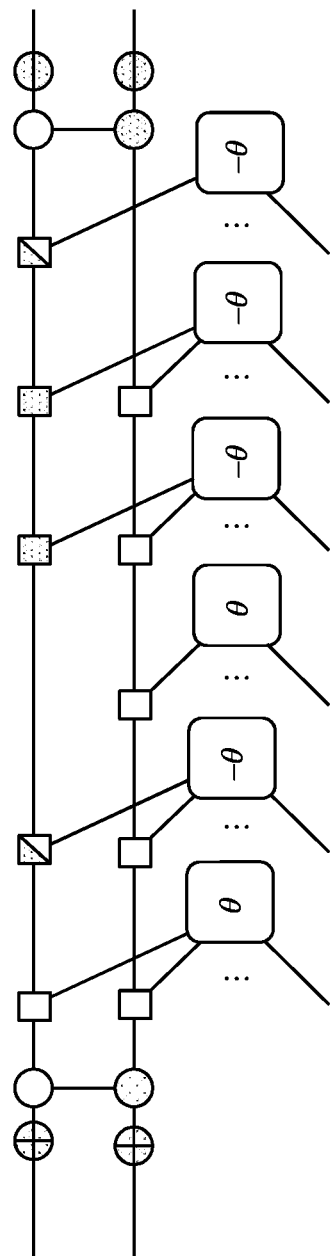
(c) Conjugation with ^X gates to diagonalize the second qubit.
FIG. 3 (cont. ii)

```
function UPDATESINGLEQUBITS(S, Q, C)
   for g ε Q do
      p ← Find CommonPauli(S, q)          ▷ p: Maybe Pauli
      if p ≠ None then
         S ← UpdateGadgetsSingleQubit(S, p, q)
         Q ← Q\{q}
         C ← AddCliffordsSingleQubit(C, p, q)
      end if
   end for
   return (S, Q, C)
end function function UPDATEPAIRQUBITS(S, Q, C)
   for $q_a$ ε Q do
      for $q_b$ ε Q\{$q_a$} do
         ($p_a$, $p_b$) ← FindValidPaulis(S, q)    ▷ ($p_a$, $p_b$) : Maybe Pair Pauli
         if (PP) ≠ None then
            S ← UpdateGadgetsPairQubit(S, $p_a$, $p_b$, q)
            Q ← Q\{$q_b$}
            C ← AddCliffordsPairQubit(C, $p_a$, $p_b$, q)
            return (S, Q, C)
         end if
      end for
   end for
   return (S, Q, C)
end function function GADGETDIAG(S)
   Q ← Qubits(S)
   C ← EmptyCircuit(Q)
      while Q non-empty do
         (S, Q, C) ← UpdateSingleQubits(S, Q, C)
         if Q empty then
            break
         end if
         Q' ← Q
         (S, Q, C) ← UpdatePairQubits(S, Q, C)
         if Q=Q then
            (S, Q, C) ← Greedy Diagonalisation (S, Q, C)
         end if
      end while
   return (S,C)
end function
```

FIG. 4

(a) Example set of adjacent commuting Pauli gadgets.

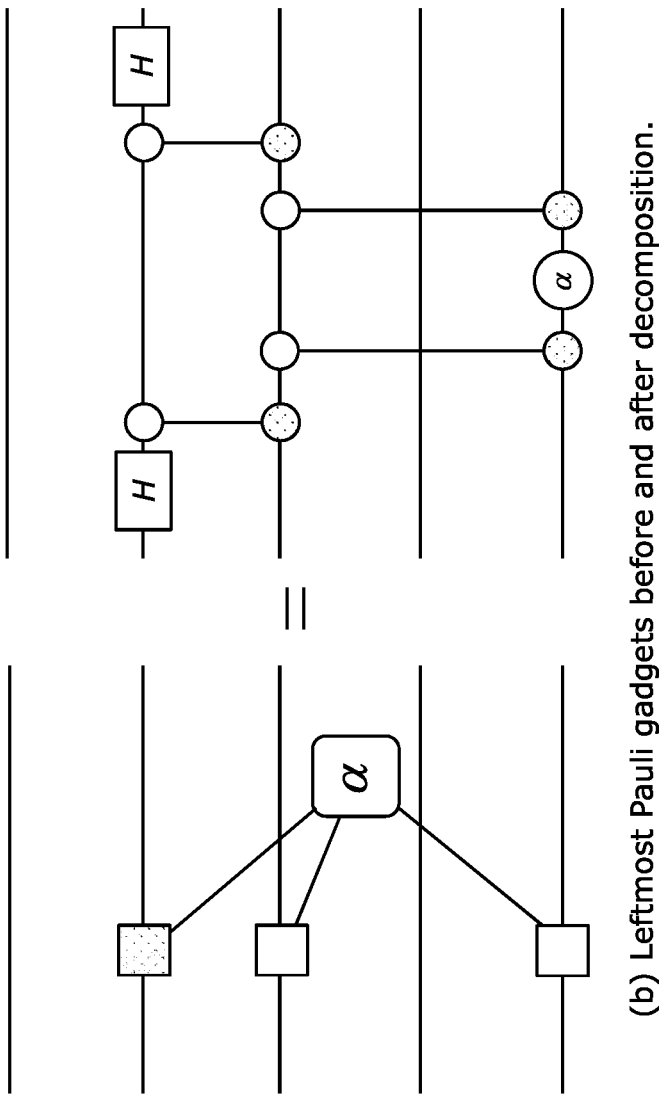
(b) Leftmost Pauli gadgets before and after decomposition.
FIG. 5 (cont. i)

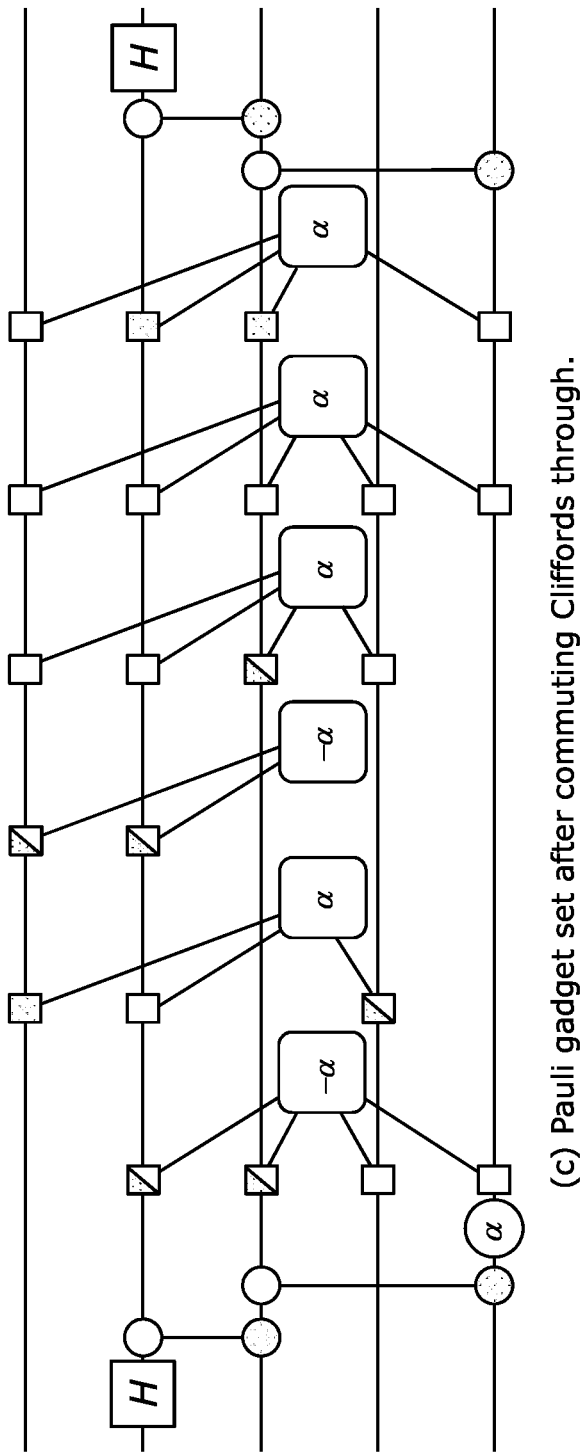
(c) Pauli gadget set after commuting Cliffords through.
FIG. 5 (cont. ii)

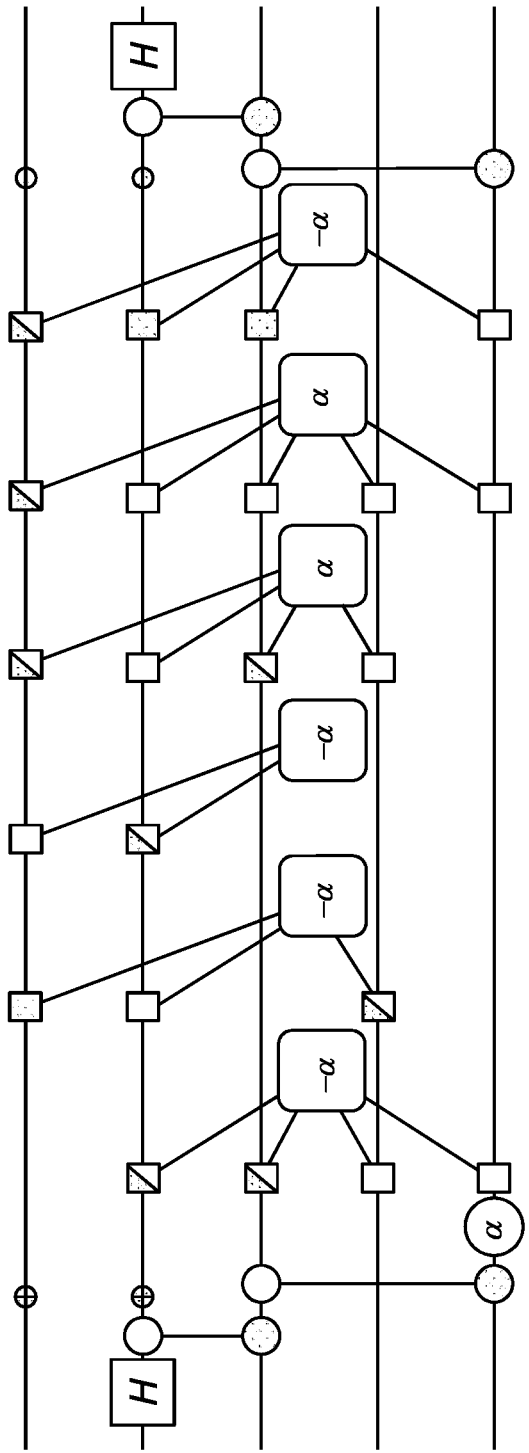
(d) Theorem 5.1 is satisfied by $A = Y$ and $B = Y$ for the first two qubits. Single-qubit rotations are applied to convert to the Z-basis.
FIG. 5 (cont. iii)

(a) Diagonalise the second qubit with a ^X.

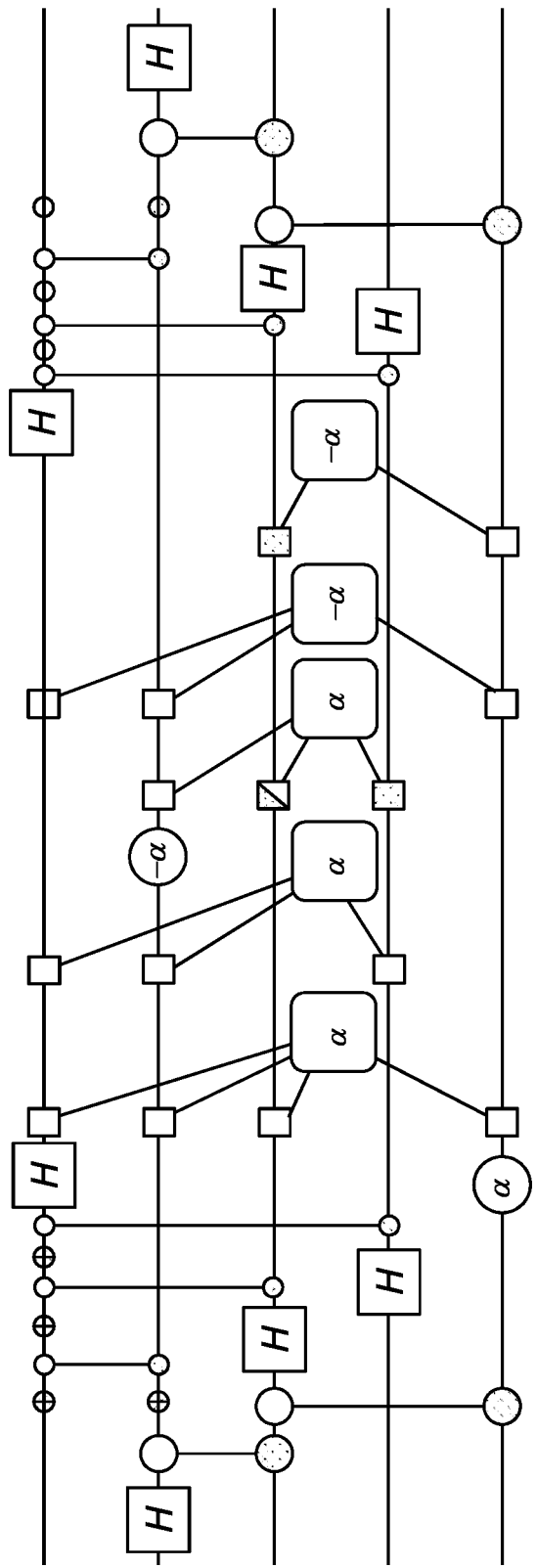
(b) Repeat the procedure for the remaining qubits to diagonalize fully the set.
FIG. 6 (cont. i)

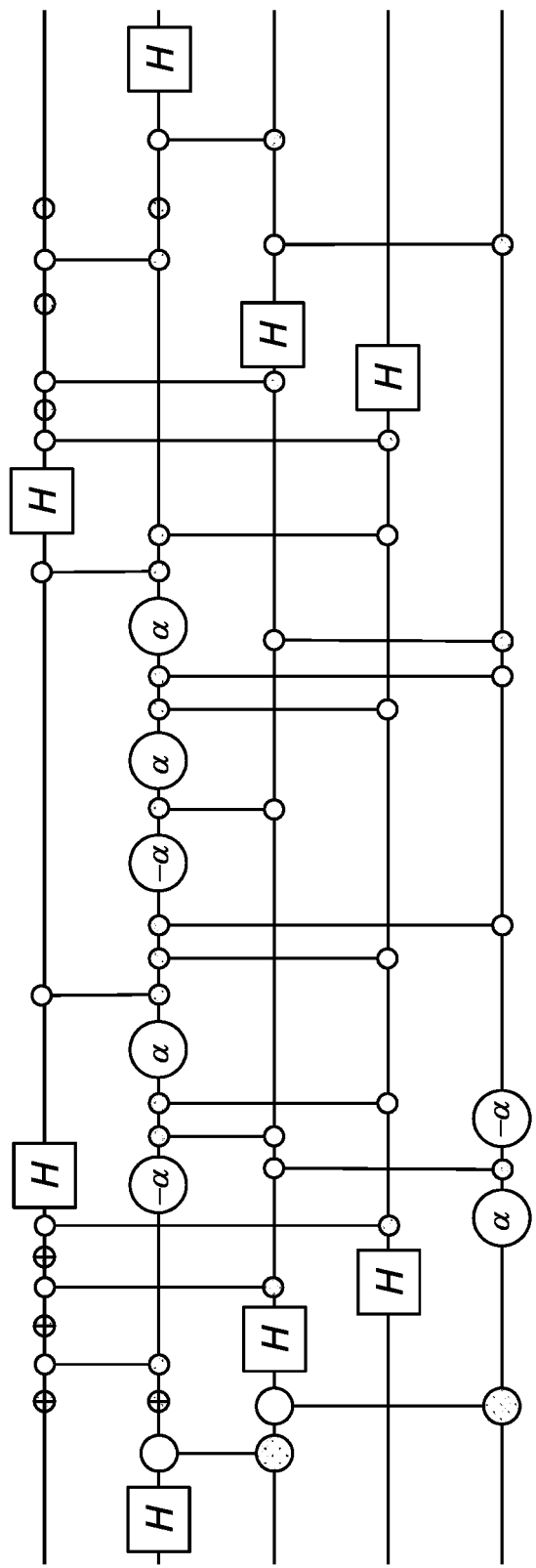
(c) Convert phase gadgets to ^X and Rz gates using GraySynth [7].
FIG. 6 (cont. ii)

(a) Bravyi-Kitaev qubit encoding.

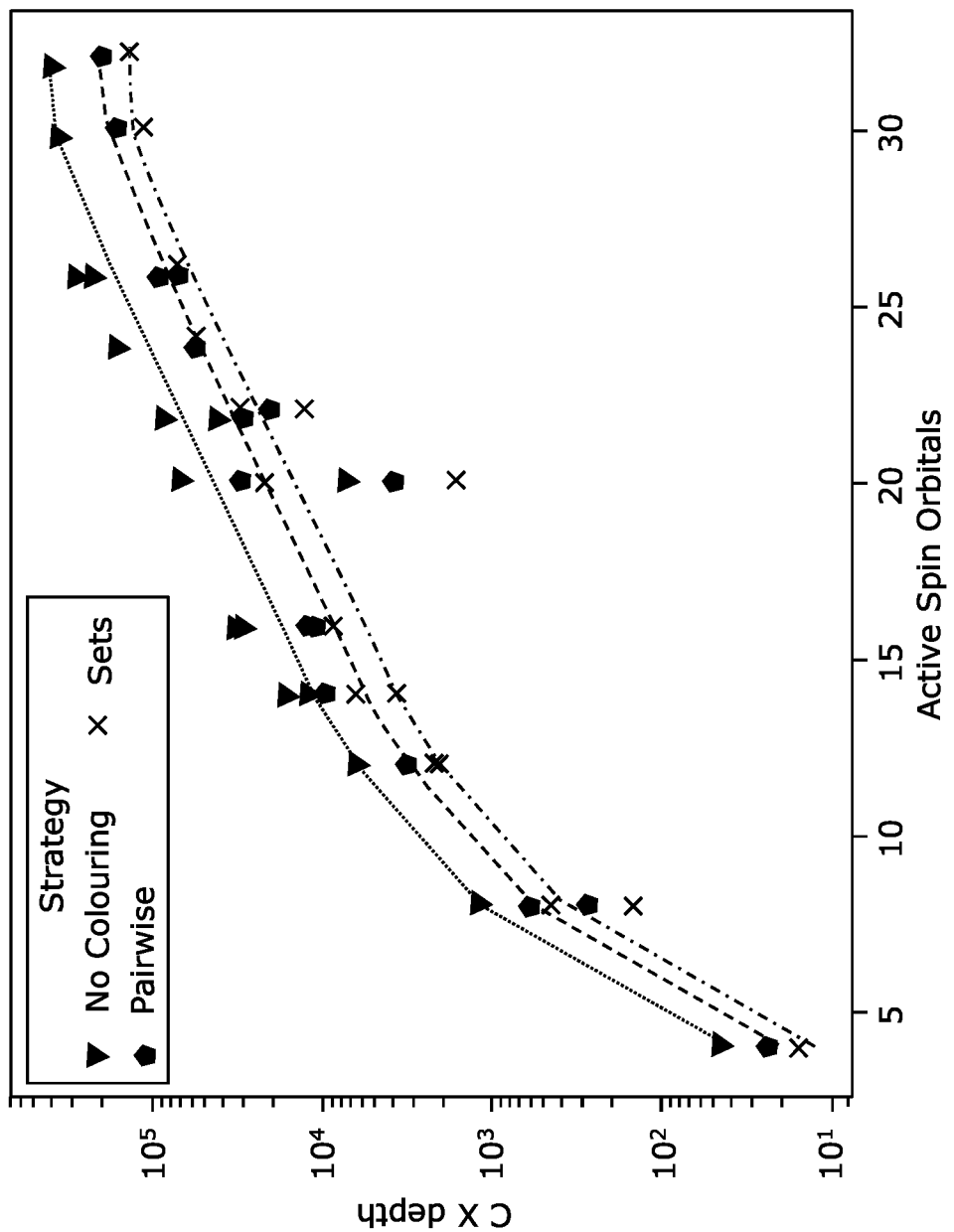
(a) Bravyi-Kitaev qubit encoding.
FIG. 9A (cont. i)

(b) Jordan-Wigner qubit encoding.

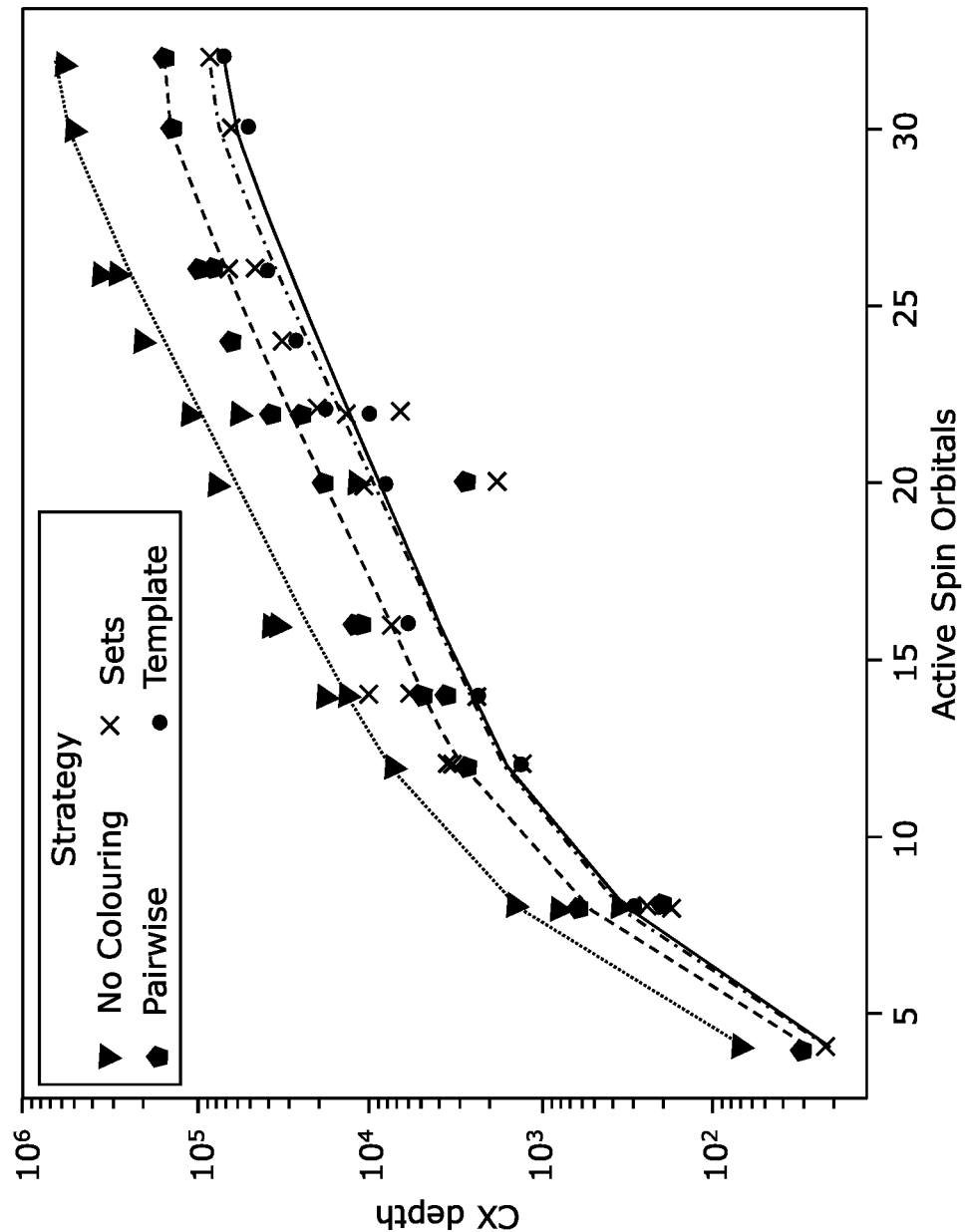
(b) Jordan-Wigner qubit encoding.
FIG. 9B (cont. i)

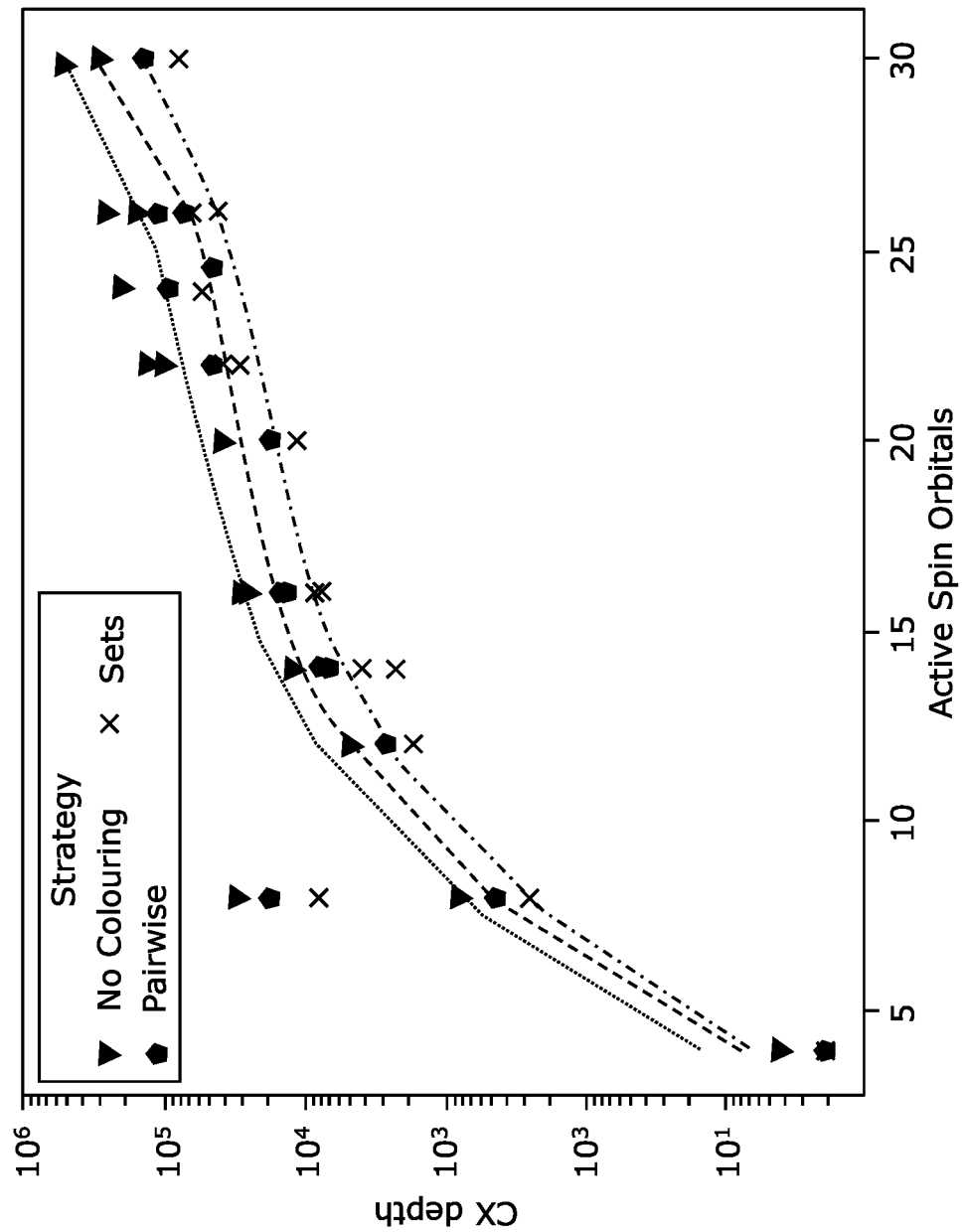
(c) Parity qubit encoding.
FIG. 9C (cont. i)

SYSTEM AND METHOD FOR GENERATING A QUANTUM CIRCUIT

FIELD

The present application relates to quantum computing and in particular to a system and method for generating a quantum circuit.

BACKGROUND

The Variational Quantum Eigensolver (VQE) is a hybrid quantum-classical algorithm for the estimation of ground state energies of quantum systems (such as molecules) on Noisy Intermediate Scale Quantum (NISQ) devices [31, 37, 34]. It employs the variational principle to approximate the ground state of some Hamiltonian (an eigenstate) using a subroutine performed on a quantum computer inside a larger optimization routine performed on a classical computer. In particular, the VQE system utilises a parameterised quantum circuit as an ansatz (trial solution); the Unitary Coupled Cluster (UCC) ansatz [35] is thought to be well-suited for this purpose.

The VQE algorithm typically involves preparing an initial quantum state on a quantum computer and generating an ansatz quantum state by applying the parameterised quantum circuit to the initial quantum state. The expectation value of the resulting Hamiltonian (the energy of the quantum system being simulated) is determined based on the quantum properties of the system. The parameters of the parameterised quantum circuit are then updated in accordance with the VQE algorithm to try to reduce the expectation value in an optimization (minimisation) procedure to converge towards the ground (reference) state of the quantum system ([101]).

The UCC ansatz is physically motivated by a molecular system and is believed to converge to chemical accuracy more quickly than alternative quantum circuits. However, the circuit depth of the UCC ansatz for many existing implementations scales poorly with respect to the size of molecule, and hence the time taken to run the subroutine can be long. In addition, the error rate of the subroutine scales with the number of entangling gates required.

A quantum computer generally supports a fixed number (set) of qubits, for example, 8 or 16. Operations, implemented as gates, may be performed on the set of qubits. These gates are usually provided as one-qubit gates or two-qubit (entangling) gates according to the number of inputs to and outputs from the gate (quantum gates have the same number of outputs as inputs). The gates determine how the quantum computer manipulates the qubits of the quantum computer—hence these gates generally represent low-level operations to be performed by the hardware (rather than being hardware devices themselves).

Each set of operations which is performed in parallel across the set of qubits is referred to as a slice or layer—this can be considered as representing one step or iteration of processing. An overall computation is usually made up of multiple such slices (typically different from one another). The number of slices required for the computation is referred to as the depth of the computation, and generally reflects the length of time (duration) needed to perform the computation ([102]).

The UCC ansatz can be used to generate a specific configuration of one- and two-qubit native gates representing a quantum circuit for implementation on a quantum computer. This generation process is often referred to as compilation, with the UCC ansatz serving as the input to the compilation and a quantum circuit comprising the specific configuration of gates as the output from the compilation. Different compilation strategies may result in different configurations of gates for performing the desired computations. This in turn may significantly impact the performance of the algorithm on a quantum computer, for example, in terms of efficiency and error rate. Accordingly, enhancing the compilation strategy may directly improve the performance of the computation being performed on the quantum computer hardware.

SUMMARY

Methods and systems for generating quantum circuits are defined in the appended claims and described below in detail.

In general overview, concepts, systems and methods are described for generating a quantum circuit. In one particular embodiment, systems and methods are described for generating a quantum circuit from a Unitary Coupled Cluster (UCC) ansatz. In embodiments the UCC ansatz represents the excitation of a reference state by a parameterised operator including excitation operators. The UCC ansatz includes multi-qubit Pauli operators, referred to as Pauli strings, determined from each excitation operator. In embodiments, a method for generating a quantum circuit includes partitioning the Pauli strings into mutually commuting sets and sequencing the Pauli strings by set. The method further generating Pauli gadgets from the Pauli strings. In embodiments, the Pauli gadgets have the same sequencing by set as the Pauli strings. In embodiments, generating Pauli gadgets from the Pauli strings is accomplished via by Trotterization. In embodiments, each set of Pauli gadgets is diagonalised to convert the Pauli gadgets into phase gadgets which are then transformed into one- and two-qubit native gates to generate the quantum circuit.

Also described is a system and a method for generating a quantum circuit, in which a computer-implemented method comprises generating a quantum circuit from a Hamiltonian using a parameterised operator including excitation operators to represent the excitation of a reference state, wherein multi-qubit Pauli operators (referred to as Pauli strings) are determined from each excitation operator. The method comprises: partitioning the Pauli strings into mutually commuting sets and sequencing the Pauli strings by set; generating Pauli gadgets from the Pauli strings by Trotterization, wherein the Pauli gadgets have the same sequencing by set as the Pauli strings; diagonalising each set of Pauli gadgets to convert the Pauli gadgets into phase gadgets; and transforming the phase gadgets into one- and two-qubit native gates to generate the quantum circuit.

As disclosed herein, a system and method are provided for generating a quantum circuit from a Unitary Coupled Cluster (UCC) ansatz which represents the excitation of a reference state by a parameterised operator including excitation operators. The UCC ansatz includes multi-qubit Pauli operators, referred to as Pauli strings, determined from each excitation operator. The method comprises partitioning the Pauli strings into mutually commuting sets and sequencing the Pauli strings by set. Pauli gadgets are then generated from the Pauli strings by Trotterization, the Pauli gadgets having the same sequencing by set as the Pauli strings. Each set of Pauli gadgets is diagonalised to convert the Pauli gadgets into phase gadgets which are then transformed into one- and two-qubit native gates to generate the quantum circuit.

The compilation strategy provided by such a system and method helps to significantly reduce the circuit depth and entangling gate count. Benchmarks on realistic molecules show that using such a strategy may substantially reduce the number of entangling gates and the circuit depth—for example, in one investigation by an average of 75%, and by up to 89% (compared to a naïve compilation strategy employed by a standard compiler such as IBM's Qiskit.

The present compilation strategy may be utilised in a situation which still involves a Trotterized Hamiltonian, but which does not necessarily utilise the UCC ansatz. One example of such a further application is for QAOA (Quantum Approximate Optimization Algorithm). This application may be used for general combinatorial optimisation problems: examples include supply-line optimization and register allocation & job scheduling.

In accordance with one aspect of the concepts, systems and techniques described herein, a computer-implemented method of generating a quantum circuit from a Unitary Coupled Cluster (UCC) ansatz which represents the excitation of a reference state by a parameterised operator including excitation operators, the UCC ansatz including multi-qubit Pauli operators, referred to as Pauli strings, determined from each excitation operator, the method comprising: partitioning the Pauli strings into mutually commuting sets and sequencing the Pauli strings by set; generating Pauli gadgets from the Pauli strings by Trotterization, wherein the Pauli gadgets have the same sequencing by set as the Pauli strings; diagonalising each set of Pauli gadgets to convert the Pauli gadgets into phase gadgets; and transforming the phase gadgets into one- and two-qubit native gates to generate the quantum circuit.

With this particular arrangement, a computer-implemented method of generating a quantum circuit from a Unitary Coupled Cluster (UCC) ansatz is provided. The described method may include one or more of the following features independently or in combination with one or more other features. In embodiments, partitioning the Pauli strings into mutually commuting sets seeks to reduce (and ideally minimize) the number of sets. In embodiments, the partitioning may be performed using a graph colouring algorithm. In embodiments, a phase gadget is a Pauli gadget comprising only Z and I letters. In embodiments, each set of Pauli gadgets is diagonalised using a Clifford circuit. In embodiments, each set of Pauli gadgets is represented as: (i) a Clifford circuit; (ii) a set of phase gadgets, and (iii) an inverse Clifford circuit. In embodiments, the Clifford circuits transform between the original basis of the Pauli gadgets and a new basis in which the Pauli gadgets are represented by a corresponding set of phase gadgets. In embodiments, in which for two qubits i and j, and S being a set of m mutually commuting Pauli gadgets and am a Pauli letter on qubit k from Pauli gadget I, qubit i or j is diagonalised by conjugating with at most one entangling gate and two single-qubit Clifford gates on each side of S between qubits i and j, providing:

$$\exists A,B\in\{X,Y,Z\} s\cdot t. \forall l\in\{1,\ldots,m\}, \sigma_{il}\{I,A\} \Leftrightarrow \sigma_{jl}\in\{I,B\}$$

In embodiments, the diagonalisation may be performed by finding the Pauli string with the lowest weight; conjugating the corresponding Pauli gadget with a single-qubit Clifford gate and entangling gates; and commuting the Clifford gates through the rest of the Pauli gadgets until all the Clifford gates are outside the adjacent Pauli gadgets. In embodiments, transforming the phase gadgets into one- and two-qubit native gates to generate the quantum circuit includes using the phase polynomial formalism. In embodiments, transforming the phase gadgets by using the phase polynomial formalism includes using the GraySynth procedure. In embodiments, the method may further comprise performing Clifford peephole optimisation by finding patterns of two-qubit Clifford circuits and replacing them with equivalent circuits with lower counts of entangling gates. In embodiments, performing Clifford peephole optimisation by finding patterns of two-qubit Clifford circuits and replacing them with equivalent circuits with lower counts of entangling gates comprises performing Clifford peephole optimisation by finding small patterns of two-qubit Clifford circuits and replacing them with equivalent circuits with lower counts of entangling gates. In embodiments, the method reduces the count and depth of entangling gates of the quantum circuit relative to a naïve synthesis of the quantum circuit from the Pauli strings. In embodiments, the UCC corresponds to a molecular structure. In embodiments, the UCC corresponds to a quantum system which has a Hamiltonian which is subject to Trotterization. In embodiments, the method is used to generate a quantum circuit based on a Trotterized Hamiltonian but without using the UCC. In embodiments, the Trotterized Hamiltonian corresponds to a Quantum Approximate Optimization Algorithm.

In accordance with one aspect of the concepts, systems and techniques described herein, a compiler is configured to perform any and all of the above recited methods.

In accordance with a further aspect of the concepts, systems and techniques described herein, a system comprising at least one processor and a compiler configured to run on the processor to generate a quantum circuit from a Unitary Coupled Cluster (UCC) ansatz which represents the excitation of a reference state by a parameterised operator including excitation operators, the UCC ansatz including multi-qubit Pauli operators, referred to as Pauli strings, determined from each excitation operator, the compiler being configured to: partition the Pauli strings into mutually commuting sets and sequencing the Pauli strings by set; generate Pauli gadgets from the Pauli strings by Trotterization, wherein the Pauli gadgets have the same sequencing by set as the Pauli strings; diagonalise each set of Pauli gadgets to convert the Pauli gadgets into phase gadgets; and transform the phase gadgets into one- and two-qubit native gates to generate the quantum circuit.

In accordance with a still further aspect of the concepts, systems and techniques described herein, a method for running a Variational Quantum Eigensolver (VQE) as a hybrid quantum-classical algorithm to approximate the ground state of some Hamiltonian includes using a subroutine performed on a quantum computer insider a larger optimization routine performed on a classical computer, wherein the subroutine utilises a quantum circuit formed by diagonalising sets of Pauli gadgets to convert the Pauli gadgets into phase gadgets and transforming the phase gadgets into one- and two-qubit gates. In embodiments, the method is performed to simulate a quantum system for determining the ground state of the quantum system.

In accordance with a still further aspect of the concepts, systems and techniques described herein, a system for running a Variational Quantum Eigensolver (VQE) as a hybrid quantum-classical algorithm to approximate the ground state of some Hamiltonian using a subroutine performed on a quantum computer inside a larger optimization routine performed on a classical computer, wherein the subroutine utilises a quantum circuit formed by diagonalising sets of Pauli gadgets to convert the Pauli gadgets into phase gadgets and transforming the phase gadgets into one- and two-qubit gates.

In accordance with a still further aspect of the concepts, systems and techniques described herein, a computer-implemented method of generating a quantum circuit from a Hamiltonian using a parameterised operator including excitation operators to represent the excitation of a reference state, wherein multi-qubit Pauli operators, referred to as Pauli strings, are determined from each excitation operator, the method comprising: partitioning the Pauli strings into mutually commuting sets and sequencing the Pauli strings by set; generating Pauli gadgets from the Pauli strings by Trotterization, wherein the Pauli gadgets have the same sequencing by set as the Pauli strings; diagonalising each set of Pauli gadgets to convert the Pauli gadgets into phase gadgets; and transforming the phase gadgets into one- and two-qubit native gates to generate the quantum circuit. In embodiments, the Hamiltonian corresponds to a Quantum Approximate Optimization Algorithm.

In accordance with a still further aspect of the concepts, systems and techniques described herein, a system includes at least one processor and a compiler configured to run on the processor to generate a quantum circuit from a Hamiltonian using a parameterised operator including excitation operators to represent the excitation of a reference state, wherein multi-qubit Pauli operators, referred to as Pauli strings, are determined from each excitation operator, the compiler being configured to: partition the Pauli strings into mutually commuting sets and sequencing the Pauli strings by set; generate Pauli gadgets from the Pauli strings by Trotterization, wherein the Pauli gadgets have the same sequencing by set as the Pauli strings; diagonalise each set of Pauli gadgets to convert the Pauli gadgets into phase gadgets; and transform the phase gadgets into one- and two-qubit native gates to generate the quantum circuit.

It should be appreciated that individual elements of different embodiments described herein may be combined to form other embodiments not specifically set forth above. Various elements, which are described in the context of a single embodiment, may also be provided separately or in any suitable sub-combination.

BRIEF DESCRIPTION OF THE FIGURES

Various examples and implementations of the disclosure will now be described in detail by way of example only with reference to the following figures:

FIG. 2A shows a representation of $\Phi n(\alpha)$ (a phase gadget) in ZX-calculus notation as used in the present disclosure.

FIG. 4 shows an example of pseudo-code for the diagonalisation method disclosed herein.

FIG. 9 is split across three sheets, indicated as FIGS. 9A, 9B and 9C for the BK, JW and P qubit encoding, respectively.

DETAILED DESCRIPTION

1. General

Figure 1:
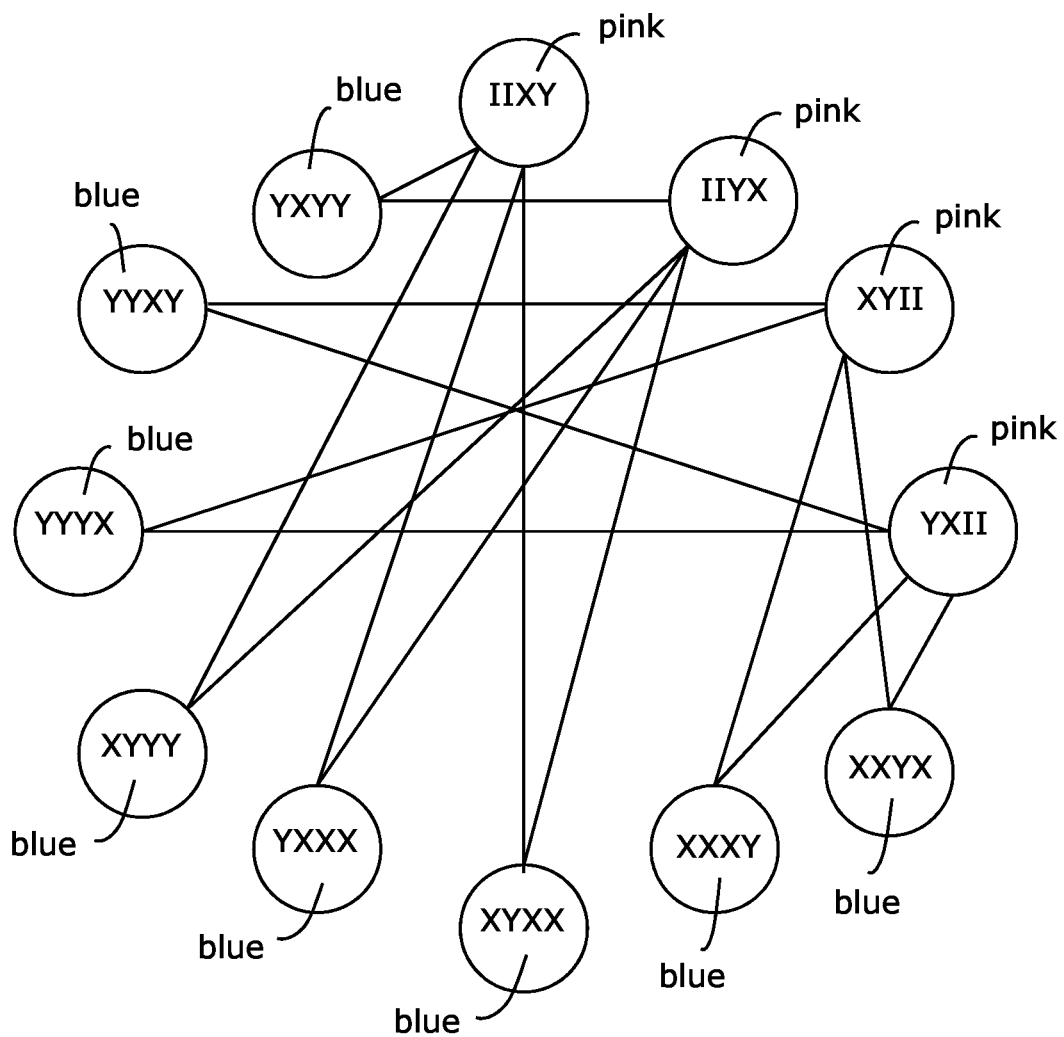
FIG. 1 is a schematic diagram showing the use of graph colouring to partition Pauli terms into sets of mutually commuting Pauli strings in accordance with examples of the approach described herein.

The present disclosure provides (inter alia) a compilation strategy for Variational Quantum Eigensolver (VQE) algorithms which use the Unitary Coupled Cluster (UCC) ansatz. This compilation strategy is designed to reduce circuit depth and gate count.

In general terms, the compilation strategy partitions terms from the UCC ansatz into mutually commuting sets, based on an equivalence between such a sequencing problem and graph colouring (this is described in more detail below). These sets are then diagonalised using Clifford circuits and synthesised using the phase polynomial formalism. It is shown that approximate solutions to this problem enable large-scale synthesis of Pauli exponentials into one- and two-qubit gates, and heuristics are described for performing this synthesis to generate low depth circuits. (A one-qubit gate has a single qubit input and a single qubit output; a two-qubit gate, which also represents an entangling gate, has two qubit inputs and two qubit outputs).

Such a compilation strategy helps to reduce a major source of error affecting the VQE algorithm: noise of the quantum device (computer). The compilation strategy increases circuit fidelity by reducing circuit depth, thereby helping to reduce (and ideally minimise) the number of noisy gates and the exposure of qubits to decoherence.

The compilation strategy may be used for any ansatz which is generated by Trotterization of an operator made up of a sum of Pauli tensor products. Accordingly, the compilation strategy may be applied to the UCC ansatz, including the k-UpCCGSD and other variations on the UCCSD ansatz, such as UCCGSD [27] (it is not intended for the so-called "hardware efficient" ansatz [117]). Compilation of an ansatz using this strategy does not require a trade-off in accuracy or convergence rate. The strategy is generic, and does not require prior knowledge of the qubit encoding, target Hamiltonian or basis set.

Potential applications of the Unitary Coupled Cluster (UCC) method and ansatz (and hence the compilation strategy described herein) include:
(a) Solid state physics—the Dynamical Mean Field Theory approach [111]; examples include the Anderson impurity model [112] and the Hubbard model [113].
(b) Condensed matter simulations with periodic boundary conditions.

(c) Quantum optics—e.g. the Jaynes-Cummings model [114].
(d) Nuclear physics, for subatomic particles [115].
(e) Any quantum system which has a Hamiltonian which is subject to Trotterization. The Hamiltonian represents the energy of a quantum system; Trotterization is a method to convert the Hamiltonian into smaller objects that are more amenable to implementation on a quantum computer.

The compilation strategy described herein has been implemented in t|ket>, a retargetable compiler developed by Cambridge Quantum Computing Ltd [103], to obtain benchmarks for a variety of UCC circuits for realistic molecules. These results demonstrate empirically that the compilation strategy described herein helps to significantly reduce the two-qubit gate count and depth. For example, the compilation strategy has been found to reduce $\Lambda X$ depth by 77.5% on average, and by up to 89%, compared to naive synthesis, for a variety of molecules, qubit encodings and basis sets.

The following terminology is adopted in this description:
a Pauli is a single-qubit operator (gate). There are four Paulis, corresponding to the 3 orthogonal axes (X, Y, Z) and I (the identity operator). See [107], in which $\sigma_x$ denotes the Pauli-X (and so on for other axes).
a Pauli string, or multi-qubit Pauli operator, is the tensor product of two or more of the single-qubit Paulis (I, X, Y, Z). Pauli strings commute under addition but not necessarily under multiplication.
a Pauli exponential is an exponentiated Pauli string.
a Pauli gadget is used to denote a particular representation of a Pauli exponential (in effect therefore, a Pauli exponential is a Pauli gadget and vice versa).
a phase gadget is a Pauli gadget in which all the Paulis in the exponentiated Pauli string are either I or Z. This exponentiated Pauli string (based on I and/or Z Paulis) is diagonal in form, and so converting arbitrary exponentiated Pauli strings (Pauli gadgets) into phase gadgets is referred to as diagonalisation.
$\Lambda X$ gates are also known as CX or CNOT gates. They are a type of "entangling gate", namely a gate which has 2-qubit inputs. These gates are the most expensive part of the circuit, in the sense that they generally contribute the most noise (which can lead to quantum decoherence). Accordingly, the number of these $\Lambda X$ gates is an important metric in the quantum circuit, alongside the depth of the $\Lambda X$ gates (the number of parallel layers of $\Lambda X$ gates that must be performed to complete the circuit). Note that increasing depth implies that additional time is required to complete a quantum computation, and such additional time also presents an increased risk that the quantum computation is subject to noise and decoherence.

It should be noted that $\Lambda X$ gates are just one type of entangling gate, and another type (or types) of entangling gate might be utilised instead of (or as well as) $\Lambda X$ gates. Accordingly, where the present description refers to $\Lambda X$ gates, this is not intended to be by way of limitation, and it will be understood that corresponding reductions in gate count and depth may also be achieved for implementations utilising other types of entangling gate in conjunction with the approach described herein.

2. The Unitary Coupled Cluster Ansatz

The Unitary Coupled Cluster Ansatz is defined by the excitation of some reference state by an operator parameterised with coupled cluster amplitudes $\vec{t}$:

$$|\Psi(\vec{t})\rangle = U(\vec{t})|\Phi_0\rangle = e^{T(\vec{t}) - T^\dagger(\vec{t})}|\Phi_0\rangle \quad (1)$$

where the left-hand term defines the quantum properties of the system being modelled (which is specified as part of input to the VQE algorithm) and the middle term represents the parameterised operator applied to an initial quantum state (also referred to as the UCC reference state). The operator T contains fermionic excitation operators $\vec{\tau}$ such that the parameterised operator can be rewritten as:

$$U(\vec{t}) = e^{\Sigma_j t_j (\tau_j - \tau_j^\dagger)} \quad (2)$$

This parameterised operator cannot be directly implemented on a gate-based quantum computer. It must be mapped to qubits and decomposed into native gates.

In order to generate a quantum circuit, we first employ Trotterization, as justified by Lloyd [29]. Here we show first order Trotterization in which the parameterised operator is approximated by a product of exponential terms dependent on the fermionic excitation operators:

$$U(\vec{t}) \approx U_{Trott}(\vec{t}) = \left( \prod_j e^{\frac{t_j}{\rho}(\tau_j - \tau_j^\dagger)} \right)^\rho \quad (3)$$

where $\rho$ is the Trotter step size. We assume $\rho=1$ for near-term cases.

To implement the Trotterized expression shown in Equation 3 on a quantum computer, we map the $\tau_j$ in the product to operations acting on qubits. This can be performed using a variety of qubit encodings, such as Bravyi-Kitaev (BK), Jordan-Wigner (JW) and Parity (P) [36]. These encodings have different resource requirements and the qubits are given different semantic meanings, but regardless of our choice we get:

$$(\tau_j - \tau_j^\dagger) = ia_j \sum_k P_{jk} \quad (4)$$

where $a_j \in \mathbb{R}$ and $P_{jk} \in \{I, X, Y, Z\}^{\otimes n}$.

We refer to an element of $\{I, X, Y, Z\}^{\otimes n}$ as a Pauli string, composed of letters from the alphabet $\{I, X, Y, Z\}$. The Pauli strings represent multi-qubit Pauli operators and are effectively supplied, as described below, by the UCC ansatz (in accordance with the quantum system that is being simulated). The weight of a Pauli string is the number of non-I letters that the Pauli string contains. It can be shown that the Pauli strings $P_{jk}$ from a given excitation operator $\tau_j$ always commute under multiplication [35]. This then gives us an expression for the Trotterized operator:

$$U_{Trott}(\vec{t}) = \prod_j \prod_k e^{it_j a_j P_{jk}} \quad (5)$$

where the $e^{it_j a_j P_{jk}}$ terms are parameterised with some angle $t_j$ for our variational algorithm. We refer to these parameterised terms as Pauli exponentials, and relabel our coefficients $t_j' = t_j a_j$. Pauli exponentials can be implemented on a quantum computer by decomposition into one- and two-qubit native gates, as discussed below in Section 4 (Pauli Exponentials).

For noisy intermediate quantum scale (NISQ) devices, two-qubit gates typically have error rates around an order of magnitude higher than one-qubit gates, as well as taking typically 2-5x as long to operate than one-qubit gates [38, 10]. Accordingly, minimising or at least reducing the two-qubit gate count and depth is an important aim for a compilation strategy.

3. Term Sequencing

Looking again at Equation 2, note that we can expand the fermionic excitation operators at this stage into Pauli strings using Equation 4, i.e. our chosen qubit encoding:

$$U(\vec{t}) = e^{i\Sigma_j \Sigma_{kl} t_j^l P_{jk}} \quad (6)$$

The $P_{jk}$ terms all commute under addition. It is only after the Trotterization step that our Pauli exponentials do not commute. It is therefore sensible to sequence the Pauli strings at this stage in a beneficial order, such that our Trotterization incurs minimal Trotter error and our circuit has low resource requirements. It is generally thought that reducing Trotter error should be a secondary concern for VQE, compared with a focus on minimising ΛX gate count and depth.

Our approach to reducing the count and depth of the ΛX gates involves partitioning the set of Pauli strings into a small number of subsets, such that within a given subset every Pauli string commutes under multiplication. This problem is known in the literature on measurement reduction [22, 18, 40] and can be represented as a graph problem.

3.1 Graph Colouring

We represent each Pauli string as a vertex in an undirected graph. An edge is given between any two vertices that correspond to Pauli strings which anti-commute. FIG. 1 shows an example of this graph representation. Finding the minimum number of mutually commuting sets which cover all vertices in this graph is then equivalent to the colouring problem, a known NP-hard problem. Accordingly, FIG. 1 shows graph colouring to partition the Pauli string into sets of mutually commuting strings. (N.B. While the parameters are not shown in FIG. 1, they are tracked for synthesis later).

We use a simple, 'largest first' greedy colouring algorithm to partition the Pauli strings [1]. The complexity of this algorithm is $\mathcal{O}(mn)$, with m the number of Pauli strings and n the number of qubits, although building the anti-commutation Pauli graph in the first place scales as $\mathcal{O}(m^2 n)$. The partitioning shown in FIG. 1 has generated two sets, one having vertices shown in blue (dark), the other having vertices shown in light red (light).

Once the vertices have been assigned colours, the UCC reference state is prepared using a short quantum circuit, and the corresponding Pauli strings are appended, colour by colour (i.e. set by set), in lexicographical order. For example, given the graph colouring solution from FIG. 1, a valid ordering of strings is: IIXY, IIYX, XYII, YXII, XXXY, XXYX, XYXX, XYYY, YXXX, YXYY, YYXY, YYYX.

In other words, this approach orders the Pauli strings by set (each set comprising mutually commutating Pauli strings under multiplication), such that the Pauli strings from one set are together (contiguous), and then the Pauli strings from another set, and so on. In effect, the Pauli strings are therefore partitioned by set. Note that the ordering of the sets themselves, i.e. which set is first in the sequence, which set is second in the sequence, and so on, may be arbitrary, as long as the contiguity of each set is maintained. Likewise, the ordering of the Pauli strings within a given set is arbitrary (it does not have to be lexicographical). This set-by-set ordering of the Pauli strings is carried over into sequence of the Pauli exponentials which are derived by Trotterization from the corresponding Pauli strings.

4. Pauli Exponentials

Notation: In order to reason about and represent the synthesis of the quantum circuit from the Pauli exponentials, we use notation inspired by the ZX-calculus [14], although our strategy can be followed without requiring knowledge of the inference rules of the calculus. A translation of relevant gates between the quantum circuit and ZX-calculus formalisms is given in FIG. 2. In particular, FIG. 2 comprises three columns, each column showing common circuit gates (left) and their representations in the scalar-free ZX-calculus (right). The left-most column shows blue/green (light) circles for operations with respect to the Z axis, while the central column shows red (dark) circles for operations with respect to the X axis. The S gate corresponds to $$Rz\left(\frac{\pi}{2}\right)$$

and the V gate to $$Rx\left(\frac{\pi}{2}\right).$$

A brief introduction to the ZX-calculus is found in Fagan & Duncan [19]; for a complete treatment see Coecke & Kissinger [15].

4.1 Phase Gadgets

We adopt the notation of phase gadgets in which $\Phi n(\alpha)$ is equivalent to the operator $$e^{-i\frac{\alpha}{2} Z^{\otimes n}}.$$

Figure 2:
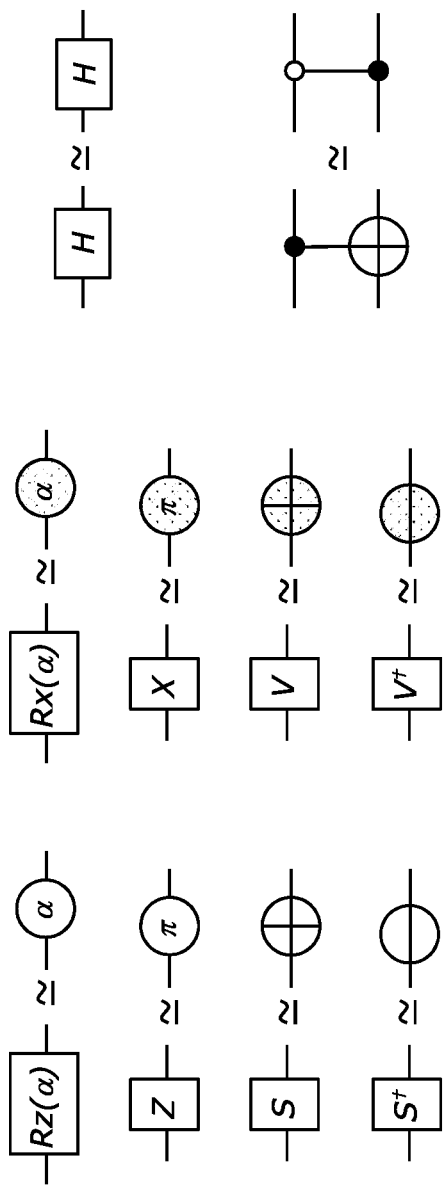
FIG. 2 illustrates a translation of relevant gates between the quantum circuit and the zx-calculus formalisms in accordance with examples of the approach described herein.

(This is consistent with the definition above that phase gadgets are Pauli exponentials, or equivalently Pauli gadgets, in which all the Paulis are Z and/or I). These phase gadgets are described in Kissinger & van de Wetering [24], and have a natural representation in the ZX-calculus. FIG. 2A shows representations of $\Phi n(a)$ in ZX-calculus notation. The algebra for phase gadgets and alternative decompositions into one- and two-qubit gates are given in [106]. (The colour scheme in FIG. 2A is the same as described above in relation to FIG. 2, with the phase gadgets being coloured light blue/green since they involve operations with respect to the Z axis).

Note that the horizontal lines in FIG. 2A, and more generally in diagrams for the ZX-calculus, correspond to qubits (hence three qubits are explicitly shown in FIG. 2A but more are implied by the vertical dotted lines). The left-hand diagram in FIG. 2A shows an n-input gate wherein n>2 (which cannot be physically implemented directly); the right-hand diagram in FIG. 2A shows an equivalent circuit formed only from two-qubit gates.

4.2 Pauli Gadgets

The correspondence between phase gadgets and Pauli-Z exponentials generalises to any Pauli exponential, $$e^{-i\frac{\alpha}{2} \sigma_1 \sigma_2 \ldots \sigma_n},$$

oy conjugating the phase gadget with single-qubit Clifford gates ([104]). In other words, we can generate any Pauli gadget (exponential) by conjugating a phase gadget with a single-qubit Clifford gate.

Figure 2B:
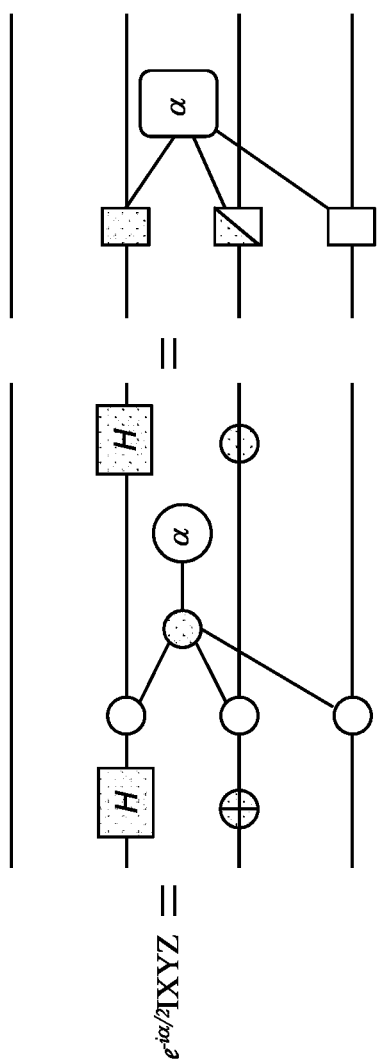
FIG. 2B illustrates the Pauli gadget diagrammatic notation for the Pauli exponential as utilised herein.

FIG. 2B illustrates the Pauli gadget diagrammatic notation for the Pauli exponential from Cowtan et al. [17], wherein Pauli exponentials are represented succinctly using the ZX-calculus notation of FIG. 2A. The red, mixed-colour, and pale blue/green boxes shown in the right-hand portion of FIG. 2B respectively represent the Pauli gadget acting on a qubit in the X, Y, and Z bases. These may be formed by a phase gadget acting on the qubits (generating all Z interactions), and then conjugating the qubits with appropriate single-qubit Clifford gates. The Clifford gates may be commuted through Pauli gadgets, but may incur a phase flip or basis change. Rules to perform this procedure for relevant Clifford gates are provided in [106].

For a set of m Pauli gadgets over n qubits, we require $\mathcal{O}$ (nm) ΛX gates for naive synthesis. Precisely, we require at most 2 m(n−1), if there are no I-Pauli gadgets. We propose herein a heuristic which synthesises a quantum circuit from a commuting set of Pauli gadgets and show that this heuristic results in a reduced number of ΛX gates (compared with the naïve synthesis) for realistic examples found in UCC ansatz circuits.

5. Set-based Synthesis

The approach disclosed herein has three steps:
1) Diagonalisation: every Pauli gadget in a given commuting set is simultaneously converted into a phase gadget by conjugating with an appropriate Clifford circuit.
2) Phase gadget synthesis: the resulting phase gadgets are converted into ΛX and Rz gates using the well-studied phase polynomial formalism [9].
3) Clifford peephole optimisation: two-qubit Clifford sub-circuits are optimised using graph rewriting techniques [19].
Terminology: An adjacent sequence of Pauli gadgets is diagonal when every Pauli string is only over Z and I letters, i.e. every Pauli gadget is a phase gadget. A qubit is diagonal over a set when, for every Pauli string in that set, the Pauli letter on that qubit is either a Z or I. A Clifford circuit is a circuit formed from Clifford gates.

5.1 Diagonalisation

Recall that $[A, B]=0 \Leftrightarrow [U AU^\dagger, U BP^\dagger]=0$ for unitaries A, B and U. This allows us to conjugate Pauli gadgets with Clifford gates while maintaining commutation between all gadgets. Given an initial commuting set of Pauli gadgets S, we are searching for a Clifford circuit C and phase gadget circuit S' such that:

$$S=CS'C^\dagger \qquad (7)$$

Equation 9 can be regarded as a change in basis from the initial basis of the Pauli gadgets to a new basis in which the set of Pauli gadgets is diagonalised—i.e. it can be represented by a set of phase gadgets S'. The motivation here is that although the Clifford gates represent additional gates (compared with the original Pauli gadgets S), this is more than compensated for by the compact gate implementation of the diagonalised phase gadgets S'(compared with a direct gate implementation for the original Pauli gadgets S). In other words, the reduction achieved by transitioning from Pauli gadgets to phase gadgets outweighs the additional Clifford gates used to accomplish this transition.

In general, we want to perform the diagonalisation on the largest possible sets of Pauli exponentials (Pauli gadgets S), as the bigger the set the more efficient the compilation when done using phase polynomial synthesis (as described below). Accordingly, this increased efficiency provides the motivation to gather the Pauli strings (which will become the Pauli exponentials) into sets, and to sequence the Pauli strings by set, as described above.

Jena et al. previously gave an algorithm guaranteed to give such a Clifford circuit C [22], although this algorithm is inefficient in terms of ΛX gates. Form Pauli gadgets, Crawford et al. recently presented two efficient constructions of C with a bound of mn−m(m+1)/2 and $\mathcal{O}$ (mn/log m) ΛX gates respectively, when m<n [18]. When n, the construction provided by Aaronson and Gottesman requires $\mathcal{O}$ ($n^2$/log n) ΛX gates [2, 30].

We find that the ΛX count of a Clifford circuit used for diagonalisation is typically much less than the asymptotic worst case for realistic examples in UCC ansatz circuits. We present below a heuristic based on diagonalising a qubit from a two-qubit chain.

5.1.1 Diagonalising a Two-Qubit Chain

Theorem 5.1. Given two qubits i and j, let S be a set of m mutually commuting Pauli gadgets, and $\sigma_{kl}$ a Pauli letter on qubit k from gadget l. Conjugating with at most one ΛX and two single-qubit Clifford gates on each side of S between qubits i and j is sufficient to diagonalise either qubit i or j iff:

$$\exists A,B \in \{X,Y,Z\} s.t. \forall l \in \{1,\ldots,m\}, \sigma_{il}\{I,A\} \Leftrightarrow \sigma_{jl} \in \{I,B\} \qquad (8)$$

Proof. Consider the action of conjugating each of the 16 possible two-qubit Pauli strings over qubits i and j with ΛX gates, with the control on qubit i and the target on qubit j. The set of strings for which this action diagonalises qubit j is D:={II, IZ, XX, XY, YX, YY, ZI, ZZ}. By inspection, $\sigma_{il} \in \{Z, I\} \Leftrightarrow \sigma_{jl} \in \{Z, I\}$, $\forall l \in \{1, \ldots, 8\}$. The application of single-qubit Clifford gates may permute the Paulis on each qubit independently, but the corresponding relation must still be satisfied for whichever Pauli permutation the single-qubit Clifford gates have generated, i.e. $\exists A, B \in \{X,Y,Z\}$ s.t. $\forall l \in \{1, \ldots, m\}$, $\sigma_{il}\{I,A\} \Leftrightarrow \sigma_{jl} \in \{I,B\}$.

Figure 3:
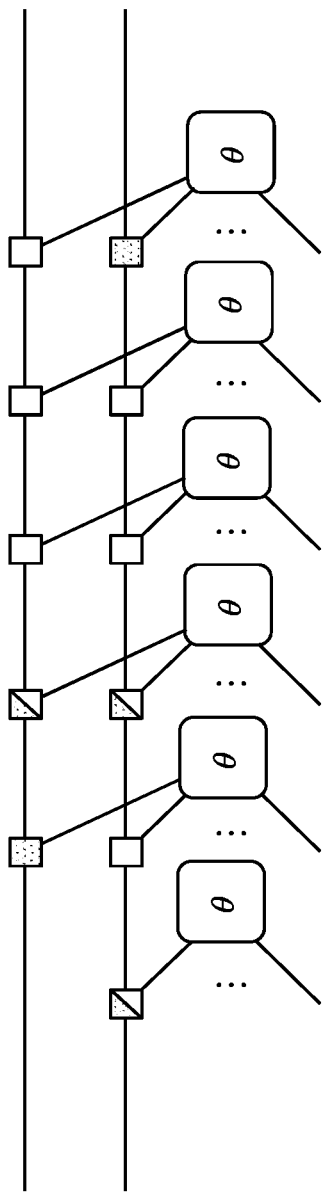
FIG. 3 shows an example of the procedure disclosed herein to diagonalise a qubit in accordance with Theorem 5.1.

Theorem 5.1 determines the single-qubit Clifford gates required to convert to the basis in which conjugation by ΛX gates will diagonalise a qubit. We demonstrate this in FIG. 3, which shows the application of Theorem 5.1 to diagonalise a qubit. FIG. 3a shows the initial circuit, including a two-qubit chain, for which Theorem 5.1 is satisfied by A=Y and B=Y. Therefore, we require V and $V^\dagger$ gates to convert to the correct basis such that A=Z and B=Z, as shown in FIG. 3b. We can then choose which qubit to diagonalise. Arbitrarily, we pick the second bit, and conjugate with the required ΛX gates as shown in FIG. 3c (in which the second qubit is shown comprising a sequence of phase gadgets). Applying Theorem 5.1 to appropriate two-qubit chains is a subroutine in our procedure to diagonalise arbitrary adjacent commuting Pauli gadgets (see FIG. 4 below).

5.1.2 Diagonalisation Algorithm

Pseudo-code for the diagonalisation method disclosed herein is presented in FIG. 4. This method comprises three functions, of which the third function represents the main routine. This main routine first calls the update single qubits subroutine (the first function in FIG. 4), which corresponds to step (i) in the algorithm below. The main routine then calls the update pairs of qubits subroutine (the second function in FIG. 4), which corresponds to step (ii) in the algorithm below. The main routine then calls the greedy diagonalisation subroutine, which corresponds to step (iii) in the algorithm below (the implementation of this subroutine is readily apparent to the skilled person and is omitted from FIG. 4).

Figure 5:
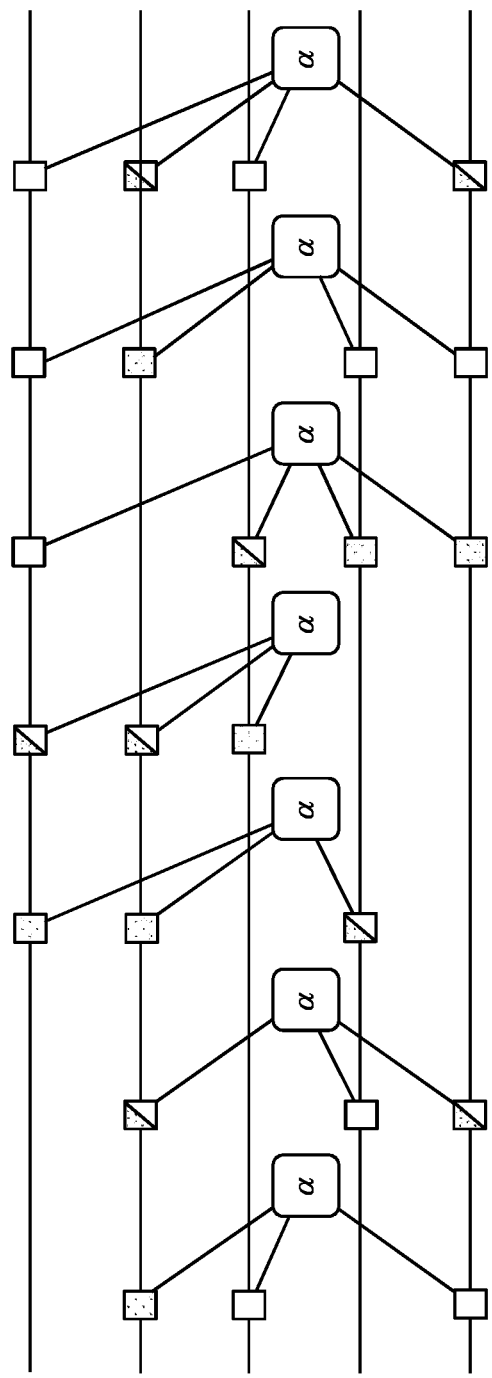
FIGS. 5 and 6 show an example of the diagonalisation method disclosed herein applied to an example set.
Figure 6:
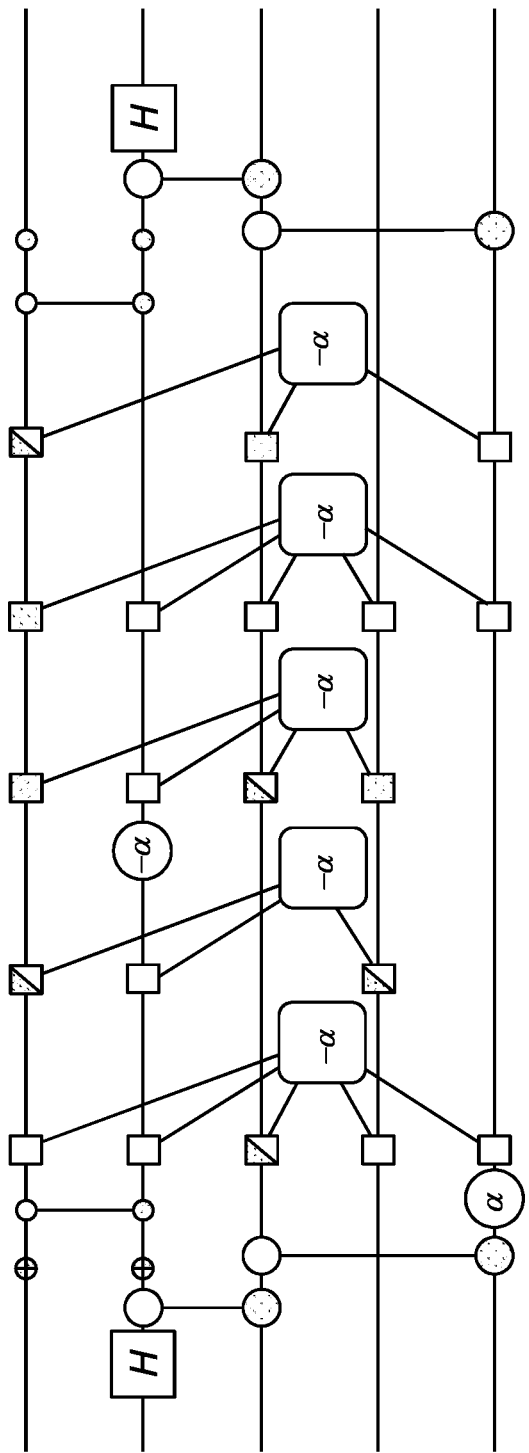

The overall time complexity for this algorithm is $\mathcal{O}$ ($mn^3$), with m the number of Pauli gadgets in the commuting set and n the number of qubits. FIGS. 5 and 6 (the latter being a continuation of the former) illustrate this method applied to an example set, as shown in FIG. 5a, having 5 qubits. The strings in this mutually commuting set are: IXZIZ, IYIZY, XXIYI, YYXII, ZIYXX, ZXIZZ, and ZYZIY. The method comprises the following operations: (i) Check whether there is a trivially diagonalisable qubit: that is, a qubit i for which ∃P∈{X, Y, Z} s.t. ∀I, $\sigma_i$∈{I,P}. Any such qubits may be diagonalised with only single-qubit Clifford gates, and ignored for the subsequent steps. This check takes time $\mathcal{O}$ (mn). The example set of FIG. 5a contains no such qubits.

(ii) Now search for a pair of qubits that satisfy Theorem 5.1 for any choice of Paulis A and B. This search can be performed in $\mathcal{O}$ (mn$^2$). If such a pair of qubits is found, perform the diagonalisation as specified in Theorem 5.1 above. There is no valid choice of A and B for any pair of qubits in the example set of FIG. 5a.

(iii) If the search is unsuccessful, adopt a greedy approach as a backup strategy. In $\mathcal{O}$ (m), find the Pauli string with the lowest weight; if there are multiple such Pauli strings, pick one arbitrarily. Conjugate the corresponding Pauli gadget with a single-qubit Clifford gate and ΛX gates to convert the Pauli string to II . . . IZ, as illustrated in FIG. 5b. Then, commute the Clifford gates through the rest of the gadgets, as shown in FIG. 5c, until all Clifford gates are outside the adjacent Pauli gadgets. Every gadget must still commute with the IIIIZ string, and therefore the last qubit must be diagonal.

Steps (i) through (iii) are repeated (iterated) until all qubits are diagonal over the set of Pauli gadgets. Following our example in FIG. 5, we find that FIG. 5c has the same two-qubit chain on the first and second qubits as our example from FIG. 3a, and can therefore be diagonalised in the same way. This diagonalisation results in the circuit in FIG. 6a. The backup strategy of step (iii) is not required for the remaining qubits, rather these can be diagonalised using steps (i) and (ii) above to produce the circuit shown in FIG. 6b after full diagonalisation. However, in the case that trivially diagonalisable qubits cannot be found, n repetitions of the steps (i) through (iii) are performed, so the method shown by the pseudo-code of FIG. 4 has time complexity $\mathcal{O}$ (mn$^3$). If the greedy approach of step (iii) has to be repeatedly performed (because trivially diagonalisable qubits cannot be found), C (the Clifford circuit) will require $\mathcal{O}$ (n$^2$) ΛX gates. If we can find an application of Theorem 5.1 for each iteration, in other words, if we do not use step (iii) above for any iteration, then C will require at most n−1 ΛX gates. For the small example set in FIG. 5A, where m=7 and with n=5 (and where step (iii) was used in the first iteration), C was found to use 5 ΛX gates.

5.2 Phase Polynomials

After diagonalisation, the interior section for each set is comprised entirely of phase gadgets (corresponding to S' in FIG. 7). This phase gadget circuit can be expressed as a phase polynomial [9]. Phase polynomials have been used for circuit optimisation [32, 30, 9, 4], and the representation of phase gadget circuits as phase polynomials has also led to circuit optimisation techniques [11].

Let D be a quantum circuit containing only ΛX gates and the gates Rz($\theta_1$), Rz($\theta_2$), . . . , Rz($\theta_m$). The action of D on a basis state |$x_1, x_2 \ldots x_n$⟩ has the form:

$$D|x_1, x_2, \ldots, x_n\rangle = e^{ip(x_1, x_2, \ldots, x_n)} |h(x_1, x_2, \ldots, x_n)\rangle \quad (9)$$

where state h($x_1, x_2 \ldots x$) is a linear reversible function and $$p(x_1, x_2, \ldots, x_n) = \sum_{i=1}^{m} \theta_i f_i(x_1, x_2, \ldots, x_n) \quad (10)$$

is a linear combination of affine Boolean functions $f_i$: $\{0,1\}^n \to \{0,1\}$. The phase polynomial of circuit D is state p($x_1, x_2 \ldots x_n$). For a further description, see Nam et al. [32].

Figure 7A:
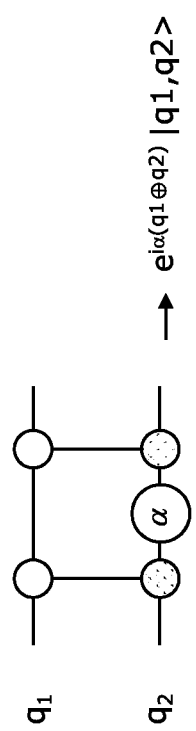
FIGS. 7A and 7B show examples of mappings between phase gadgets and quantum circuits using phase polynomials as an example of the approach disclosed herein.
Figure 7B:
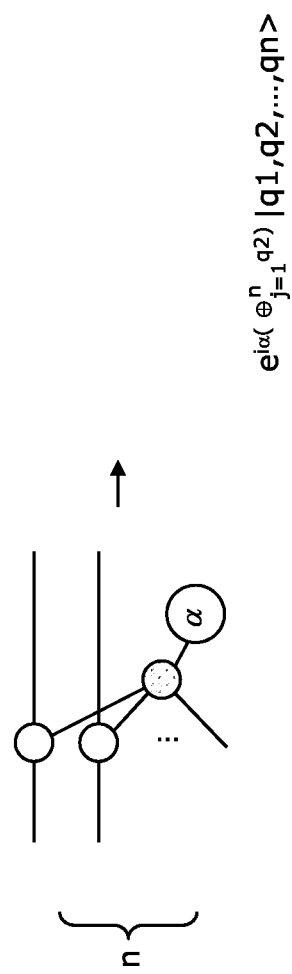

FIGS. 7A and 7B show examples of mappings between phase gadgets and quantum circuits using phase polynomials. The quantum circuit in FIG. 7A is equivalent to a phase gadget over two qubits. This generalises in that any phase gadget over n qubits is equivalent to a phase polynomial with one term, as illustrated in FIG. 7B. For all phase gadget circuits, the linear reversible function h is identity.

The phase polynomials described herein are therefore synthesised into a quantum circuit having ΛX gates and Rz(θ) gates with a low ΛX gates overhead using a heuristic from Amy et al. [7]. Optimal synthesis of phase polynomials into ΛX gates has been found to be NP-complete in specific cases, but the time complexity of finding the optimal ΛX gate count in the general case is unproven.

We use the so-called 'GraySynth' heuristic from [7] to find subsets of p($x_1, x_2 \ldots x_n$) that can be efficiently iterated with a fixed target qubit. The GraySynth procedure runs in time $\mathcal{O}$ (mn$^3$), and requires a maximum of $\mathcal{O}$ (mn) ΛX gates when the linear reversible function h is identity [6] (as is the case for the approach described herein). The implementation in Amy et al. reduced the ΛX gate count by 23% across a suite of Clifford+T benchmark circuits, with a maximum reduction of 43%.

The circuit transformations described above in Sections 3.1 and 5.1 enable us to partition our circuit into large phase polynomials divided by regions of Clifford circuits, thereby allowing the GraySynth algorithm to synthesise these phase polynomials with low ΛX overhead. The synthesised circuit generated from the interior phase gadgets for our example set of FIG. 5a is shown in FIG. 6c. Through naive decomposition, this initial set from FIG. 5a would require 34 ΛX gates, and 34 ΛX depth. The compilation approach described herein allows the ΛX count to be reduced to 22 and the ΛX depth to 18.

5.3 Clifford Peephole Optimisation

At this stage (after the use of the phase polynomial formalism), the ansatz circuit is in a form with layers of Clifford operations between {ΛX,Rz} circuits. Referring back to Equation 7, the Clifford gates C (and C†) may be directly implemented, while the phase polynomial formalism has provided a synthesis for S'. Although such an ansatz circuit could be used at this stage, an additional procedure may be performed (if desired) to further reduce the ΛX count.

Figure 8:
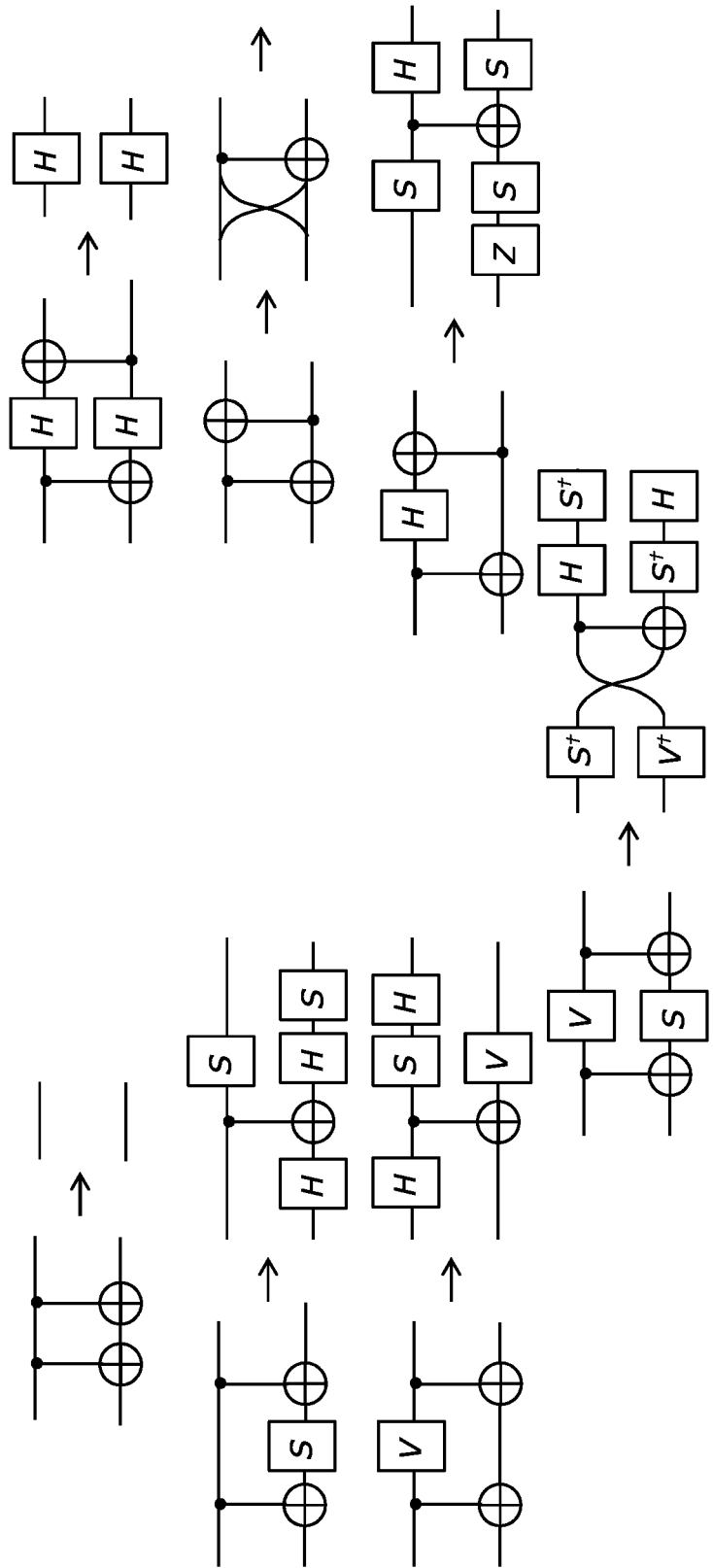
FIG. 8 shows an example of Clifford peephole optimisation as disclosed herein, in which small patterns of two-qubit Clifford circuits are identified and replaced with equivalent circuits with lower $\Lambda X$ counts.

Apart from basic cancellation of adjoint gates between Clifford layers, it is also possible to perform peephole optimisation by finding small patterns of two-qubit Clifford circuits and replacing them with equivalent circuits with lower ΛX counts. This processing is shown in FIG. 8, in which certain Clifford identities are recognised and applied to reduce the ΛX count [19]. (In FIG. 8, the S gate corresponds to $$Rz\left(\frac{\pi}{2}\right)$$

and the V gate corresponds to $$Rx\left(\frac{\pi}{2}\right)).$$

A single sweep of this optimisation can be performed in $\mathcal{O}(dn^2)$, where d is the circuit depth. Note that performing the rewrite rules may generate more instances where they can be applied, i.e. the replacement equivalent circuits with lower ΛX counts may themselves lead to further patterns which can be replaced by equivalent circuits with lower ΛX counts. Accordingly, an iterative approach may be used, in which the rewrite rules are re-applied until no more suitable patterns can be found, and/or until a chosen number of sweeps (iterations) have been applied, for example, to suit a specified compilation time.

The pattern-matching and rewriting of the Clifford peephole optimisation is performed using a directed acyclic graph (DAG), with vertices representing gates and edges representing qubits. Ports track the order of incident edges to a vertex in order to represent non-commutative operations such as the ΛX gate. This graph rewriting to perform peephole optimisation for quantum circuits is described in general terms in [5, 32, 17], and has been performed for Clifford circuits in particular by Kliuchnikov and Maslov [25]. This final step of the compilation process may be considered a relatively minor (and optional) 'clean-up' step.

Table 1 summarises the relevant complexities of the different subroutines in the overall compilation strategy described herein, in which m is the total number of Pauli exponentials, d is the depth of the circuit, and n is the number of qubits. Time complexity refers to the compilation time taken for this strategy, while ΛX complexity is defined as the maximum number of ΛX gates required for the circuit synthesis. Note that graph colouring and Clifford rewriting do not perform circuit synthesis and therefore do not have an associated ΛX complexity.

TABLE 1

|  | Time complexity | ΛX complexity |
|---|---|---|
| Graph colouring | $\mathcal{O}(m^2 n)$ | — |
| Diagonalisation | $\mathcal{O}(mn^3)$ | $\mathcal{O}(n^2)$ |
| GraySynth [7, 6] | $\mathcal{O}(mn^3)$ | $\mathcal{O}(mn)$ |
| Clifford Rewriting | $\mathcal{O}(dn^2)$ | — |

6. Results

The compilation strategy described herein has been implemented in the retargetable compiler t|ket> to benchmark this implementation on a suite of ansatz circuits for solving VQE problems relating to the electronic structure of molecules. This benchmarking included the molecules $H_2$, $H_4$, $H_8$, LiH, NH, $H_2O$, $CH_2$, $NH_3$, HNO, $H_2CO$ and $CO_2$ in the 'sto-3g' basis sets ([105]). For the smaller molecules, we also used the '63 1g' and 'ccpvdz' bases ([105]). We tested across the Bravyi-Kitaev (BK), Jordan-Wigner (JW) and Parity (P) encodings referenced above.

The benchmarking comparisons made are between:
1. Naive decomposition: a quantum circuit generated by iterating through the list of Pauli exponentials given by naive Trotterization of the excitation operators and converting each Pauli exponential individually into ΛX ladders (patterns of ΛX gates extending in the depth direction of the circuit).
2. Templated lexicographical operator sequence (TLOS): for ansatz circuits generated using the JW encoding, we compare against a simple implementation of the best known previous strategy for JW circuit synthesis: operator sequencing methods from Hastings et al. [21] with templated excitation operators from Nam et al. [3]. We assume the qubit resources are scarce and do not allow the use of ancillae for this comparison (Hastings et al. showed that the use of ancillae may reduce ΛX overhead significantly). We are not aware of similar strategies for the BK or P encoding.
3. Pairwise synthesis: a quantum circuit generated by graph colouring and then synthesising Pauli gadgets within a set in a pairwise manner using the methods from Cowtan et al. [17].
4. Set synthesis: our full compilation strategy—graph colouring, diagonalisation, phase polynomial synthesis and Clifford peephole rewriting.

Circuits in our test set were chosen to have a ΛX count and depth of less than $10^6$ when decomposed naively. All results were obtained using a machine with a 2.3 GHz Intel Core i5 processor and 8 GB of 2133 MHz LPDDR3 memory running MacOS Mojave v10.14.

Figure 9A:
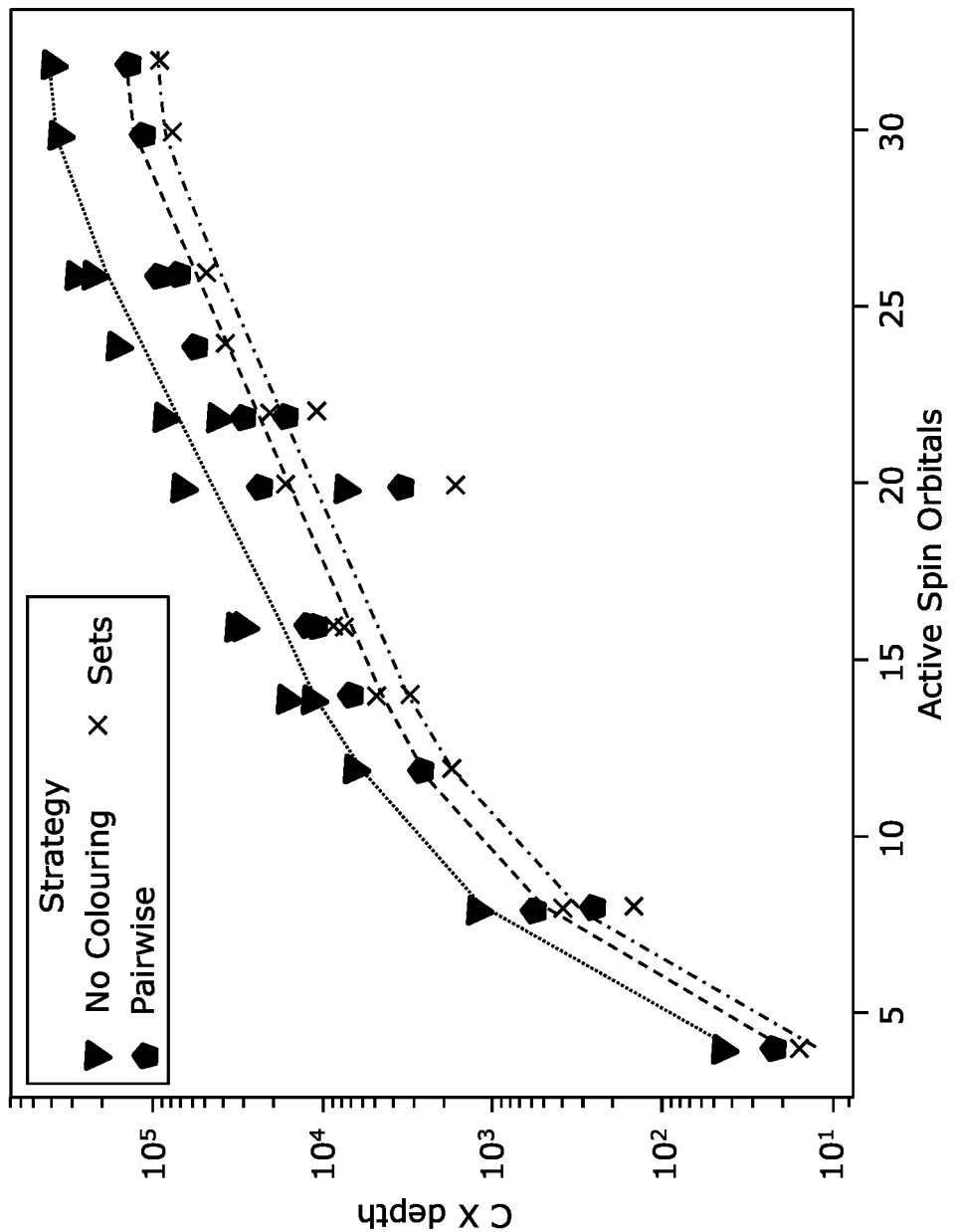
FIGS. 9A, 9B and 9C show results from examples of $\Lambda X$ metrics obtained using the compilation strategy disclosed herein in comparison with $\Lambda X$ metrics obtained using other known compilation strategies for use in simulating molecules with varying active spin orbitals and using different qubit encoding methods.
Figure 9B:
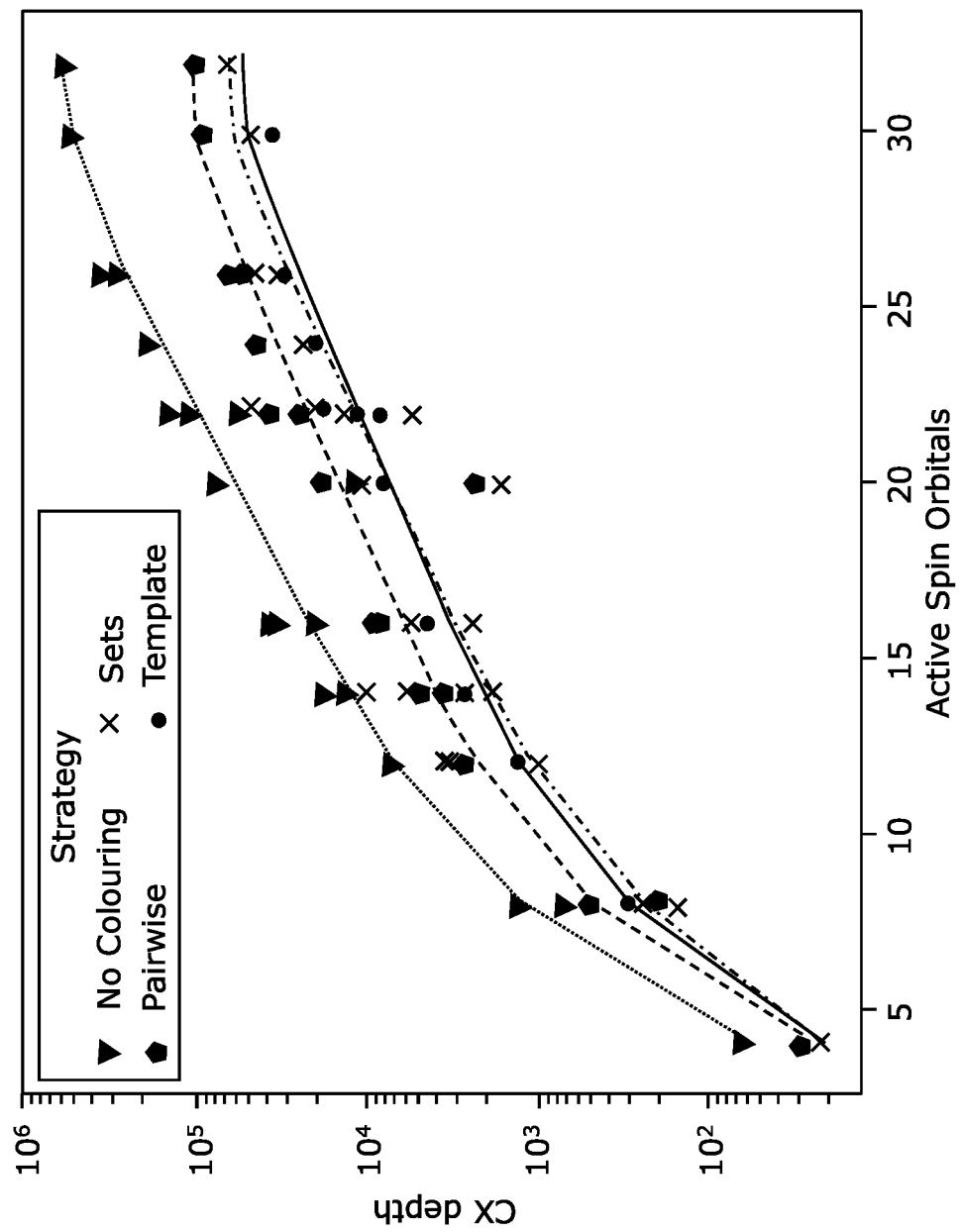
Figure 9C:
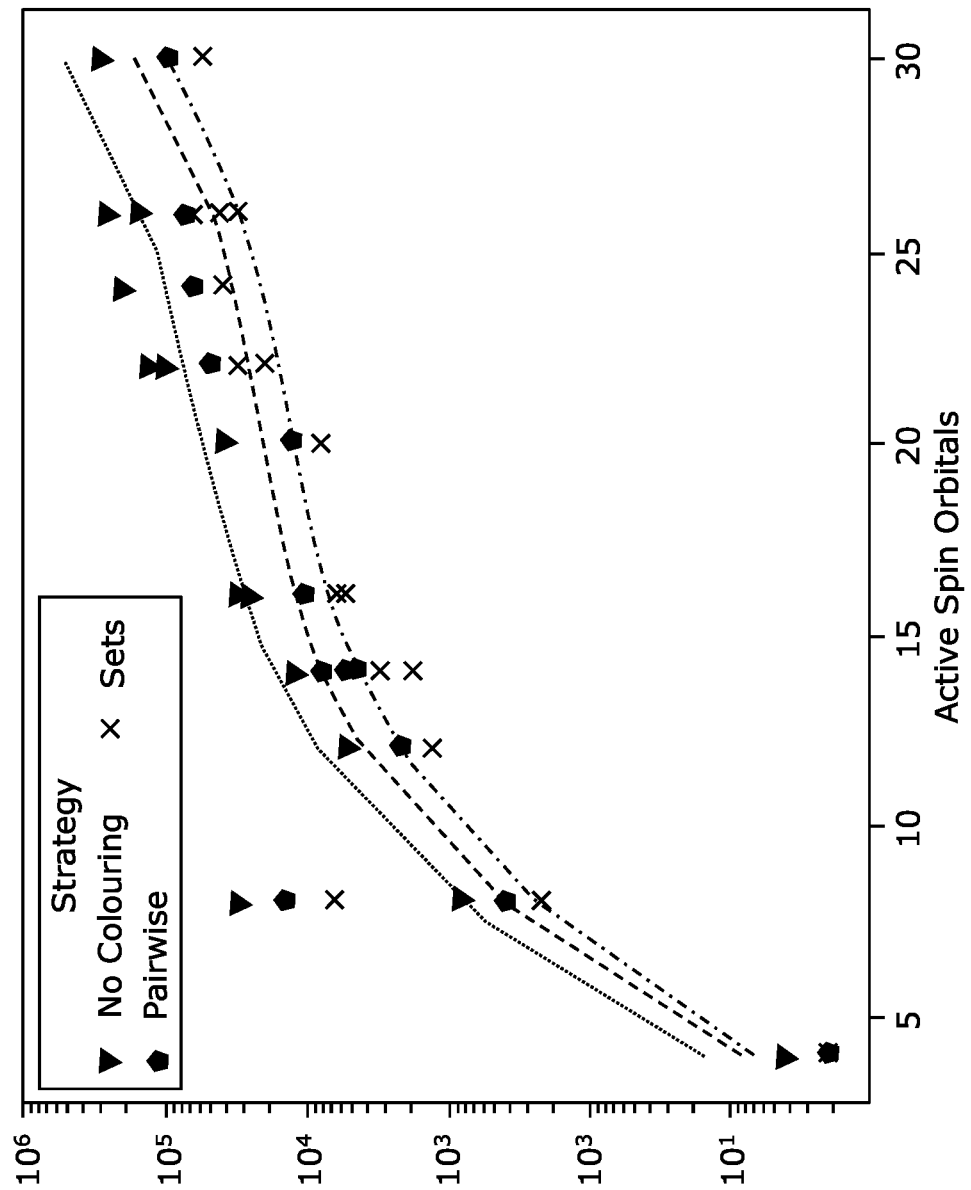

A comparison of ΛX metrics for different compilation strategies for molecules with varying active spin orbitals and using different qubit encoding methods is shown in FIG. 9. Note that FIG. 9 is split across three sheets as FIGS. 9A, 9B and 9C representing the BK, JW and P qubit encoding respectively. The naïve decomposition (1) is labelled as "no colouring" in FIG. 9 and a 4th-degree polynomial least-squares fit has been added to the plots to suggest scaling. It can be seen that the set-based synthesis strategy (4) as disclosed herein outperforms pairwise (3) and naive (1) on all encodings, and performs approximately equally with the TLOS method (2) for the JW encoding.

TABLE 2

|  | Qubit Encoding Method | Mean ΛX count reduction (%) | Mean ΛX depth reduction (%) |
|---|---|---|---|
| Pairwise Synthesis | BK | 48.2 | 60.0 |
| Set-based Synthesis | BK | 65.5 | 73.2 |
| Pairwise Synthesis | JW | 66.4 | 72.2 |
| Set-based Synthesis | JW | 81.3 | 84.6 |
| TLOS Synthesis | JW | 81.6 | 84.0 |
| Pairwise Synthesis | P | 46.2 | 59.8 |
| Set-based Synthesis | P | 68.2 | 75.3 |
| Pairwise Synthesis | All | 53.6 | 64.0 |
| Set-based Synthesis | All | 71.8 | 77.5 |

Set-based synthesis gives greater fractional reductions for larger circuits than for smaller ones. For the largest circuits, a reduction of up to 89% in ΛX depth has been achieved, compared to the mean average reduction in ΛX depth of 77.5% as presented in Table 2.

Note that the compilation strategy described herein generally assumes the qubits have all-to-all connectivity, in other words, ΛX gates are allowed between any two qubits. Some hardware implementations of a quantum computer may constrain such connectivity; in this case appropriate routing may be utilised to help a circuit conform to the constraints (see below).

7. Discussion

Accordingly, the approach described herein represents an empirically successful method to efficiently synthesise the UCC ansatz into one- and two-qubit gates. This approach has been shown to achieve large average reductions in ΛX metrics for the Bravyi-Kitaev and Parity qubit encodings, and to match an existing strategy for the Jordan-Wigner encoding. It is emphasised that the approach described herein is not limited to these three qubit encodings, but rather may be utilised for any other qubit encodings which generate similar Trotterized excitation operators. Furthermore, although the present approach has been described in the context of the synthesis of a UCC ansatz, this approach may be utilised in other situations and contexts, as discussed below.

7.1 Applications for Measurement Reduction

Measurement reduction for VQE is a method to simultaneously measure terms in a Hamiltonian which commute and thereby reduce the number of circuits required to run VQE [22, 18, 40]. For realistic devices, assuming that the only available native measurements are single-qubit Z-basis measurements, generating a Clifford circuit to diagonalise this set is required. Minimising this Clifford circuit using Theorem 5.1 as presented above may reduce the $\Lambda X$ overhead required for this measurement reduction.

7.2 Architecture-Aware Synthesis

Instead of introducing a SWAP network to enforce connectivity constraints on NISQ devices, recent work has explored the possibility of resynthesising a circuit in a topologically aware manner for limited gate sets [23, 33, 39]. This constrained synthesis has been found to typically produce lower $\Lambda X$ counts than SWAP networks, and phase polynomials are a viable class of circuit for constrained synthesis [8]. If topologically constrained phase polynomials can be composed with Clifford regions in a manner that respects architecture, this would appear to be a promising strategy for those devices with limited connectivity.

7.3 Applications to Fault Tolerant Computation

Although the approach described herein has been implemented for VQE, it may be directly ported over to nonvariational quantum algorithms for Hamiltonian dynamics which require gate counts and qubit numbers that are too high for NISQ computers. Recent work by Gui et al. [20] has performed term sequencing for quantum evolution defined by a time-dependent Hamiltonian which is mapped to a quantum circuit. Reducing Trotter error is more important for fault-tolerant algorithms than for VQE, and Gui et al. argue term sequencing (such as performed in the present application) would help to reduce, and ideally minimise, Trotter error.

The compilation strategy proposed herein is primarily intended to reduce two-qubit gate count and depth; however, these parameters are not considered to be as expensive on planned fault tolerant devices as magic states, since the $\Lambda X$ gate can be performed without distillation. However, work by Litinski [28] shows that on surface code-based computers, performing a two-qubit gate may be as costly in the worst case as magic state distillation, hence two-qubit gate reduction would still represent a valuable optimisation.

Moreover, the circuits produced by the compilation strategy disclosed herein have a structure such that all non-Clifford gates reside in partitioned phase polynomials. T-count and depth optimisation have been successfully performed using the phase polynomial formalism via matroid partitioning [9], with benchmarks showing up to 65.7% T-count reduction and 87.6% T-depth reduction without ancillae, and up to 99.7% T-depth reduction using (with) ancillae. The parities of non-Clifford rotations in a phase polynomial generated via diagonalisation must all be different, and therefore the T-counts cannot be optimised using phase-folding; nevertheless, T-depth reduction may still be achieved using the compilation strategy described herein.

8. General

Figure 10:
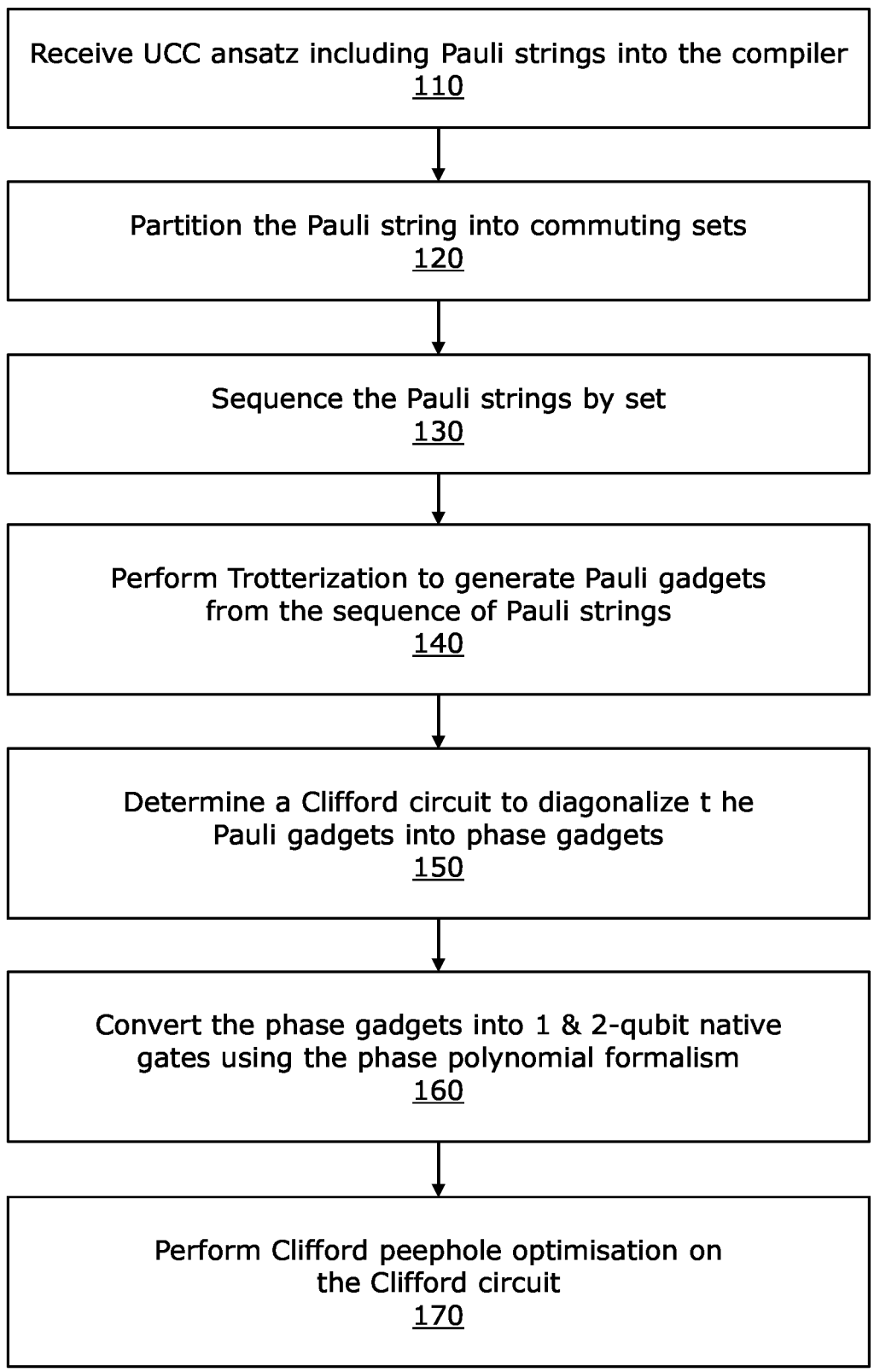
FIG. 10 is a flowchart illustrating an example of performing a compilation in accordance with the compilation strategy disclosed herein.

FIG. 10 is a flowchart showing an example method in accordance with the approach described herein. This method is generally implemented by a compiler used to generate a quantum circuit for use in a quantum computer. The method commences with receiving as input the UCC ansatz at operation 110. The UCC ansatz (which is a known entity) includes, inter alia, Pauli strings corresponding to (derived from) excitation operators for a Hamiltonian that describes a physical (quantum) system. For example, the UCC ansatz is commonly used to simulate molecular systems, such as to determine the ground state and configuration for such a molecular system, and the excitation operators reflect the physical properties of the molecular system which is being simulated.

At operation 120, the Pauli strings from the UCC ansatz are partitioned into sets, such that all the Pauli strings in a given set are required to commute with one another under multiplication. Conversely, Pauli strings that are partitioned into different sets are not required to commute with each other under multiplication. Each Pauli string from the UCC ansatz is allocated (partitioned) into a single set. The objective is to have as few sets as possible, which also implies that the sets are generally large to accommodate all the Pauli strings from the UCC ansatz. A graph colouring algorithm may be used to find a partitioning solution which satisfies (exactly or approximately) this objective.

At operation 130, the Pauli strings are sequenced by set, i.e. all the Pauli strings in a given set are contiguous with one another in the sequencing. An arbitrary ordering may be used for the Pauli strings within any given set, and also between the different sets.

At operation 140, Trotterization is used to generate a sequence of Pauli gadgets, such that Pauli gadgets that derive from Pauli strings in a given set are likewise grouped contiguously. The Trotterization provides an approximation of the Hamiltonian based on the Pauli gadgets to facilitate further analysis.

The sequence of Pauli gadgets from operation 140 may be used directly to provide a potential quantum circuit implementation of the UCC ansatz, however, such a quantum circuit may be relatively complex. Therefore at operation 150, a Clifford circuit is determined to diagonalise each set of Pauli gadgets into a corresponding set of phase gadgets. Phase gadgets are a subset of Pauli gadgets having a diagonalised form, which in turn helps to achieve a more compact and efficient quantum circuit implementation of the UCC ansatz.

Accordingly, in operation 150, a set of Pauli gadgets from operation 140 is equated to an expression comprising three components: (i) a Clifford circuit; (ii) a set of phase gadgets, and (iii) an inverse (conjugated) Clifford circuit. The Clifford circuits in effect transform between the original basis of the Pauli gadgets and a new basis in which the Pauli gadgets are phase gadgets. Although the Clifford circuits used to these basis changes represent additional overhead, i.e. additional gates, in the resulting quantum circuit, this cost is outweighed by the savings (in gates) arising from the use of phase gadgets rather than the more general Pauli gadgets.

Note that the diagonalisation is performed separately on each set of Pauli gadgets. The larger the set (i.e. the more Pauli gadgets it contains), the greater the saving that is typically achieved as a result of converting the Pauli gadgets to phase gadgets—hence the motivation to find large sets in the partitioning of operation 120. Note also that although the present implementation uses Clifford circuits for the diagonalisation from Pauli gadgets to phase gadgets, other techniques for performing such a diagonalisation might also be implemented.

Once the sequence of Clifford circuits and phase gadgets has been determined at operation 150, then the sequence of diagonalised phase gadgets is converted into native gates at operation 160 using the phase polynomial formalism (or any other suitable technique for synthesizing native gates from phase gadgets). In addition, the Clifford circuits may be simplified in operation 170 using a technique such as peephole optimisation. Note that this optimisation of operation 170 is optional and may be omitted in some implementations. Furthermore, the ordering of operations 160 and 170 may be altered if so desired, e.g. so that operation 170 is performed before or at the same time as operation 160.

The outcome of the processing of FIG. 10 is that a quantum circuit is synthesized to represent the received UCC ansatz, and this quantum circuit can then be implemented on a quantum computer to simulate the physical (e.g. molecular) system represented by the UCC ansatz.

Figure 11:
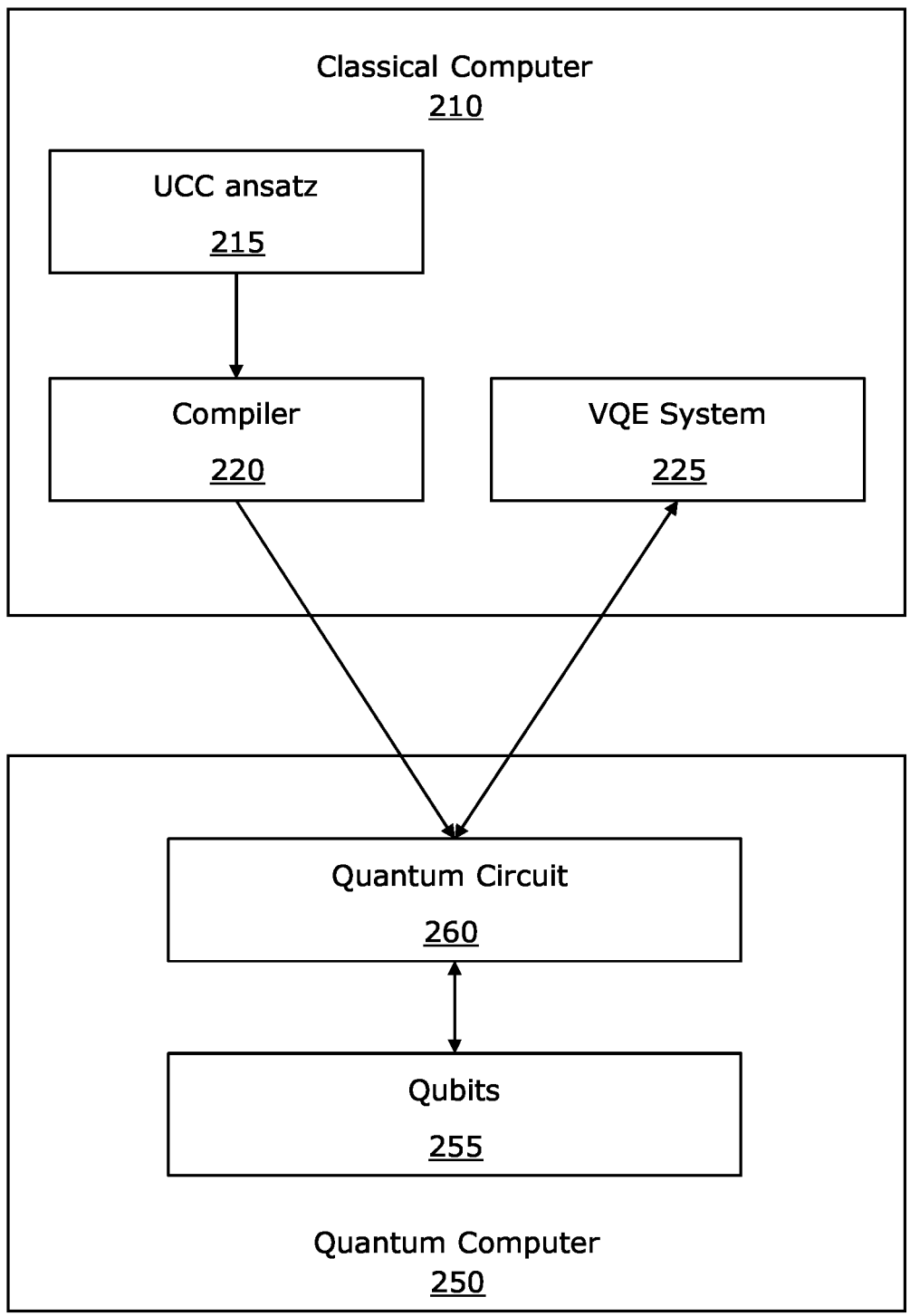
FIG. 11 is a schematic diagram showing an example of a computing environment for utilising the compilation strategy disclosed herein.

FIG. 11 is a schematic diagram of a computing system for implementing the approach described herein. The computing system includes a quantum computer 250 and a classical (non-quantum computer) 210. Note that for clarity, the standard internal hardware and software components of classical computer 210, such as a processor, memory, storage, input/output, communications, operating system and so on that are not directly relevant to an understanding of the approach described herein are omitted from FIG. 11. Likewise, the standard internal components of quantum computer are generally omitted from FIG. 11, with the exception of qubits 255.

The UCC ansatz 215 is created or loaded onto computer 210 where it serves as an input to a compiler 220. The compiler 220 may implement the method of FIG. 10 to derive a quantum circuit 260 from the UCC ansatz. As described above, the quantum circuit 260 derived from this method is well-suited to the hardware characteristics of the quantum computer 250 by reducing AX counts (for the number and depth of such gates), thereby helping (inter alia) to reduce noise and the susceptibility to decoherence.

In general, the compiler generates the quantum circuit 260 on the classical computer 210 and the quantum circuit is then loaded onto the quantum computer 250 at run-time as part of the VQE system 225. Note that although FIG. 11 shows the VQE system 225 running on the same classical computer 210 as compiler 220, in many implementations the compiler 220 will run on one classical computer at compile time and the VQE system will run on a different classical computer at run time. The VQE performs an iterative optimisation in which certain functionality within the iterative procedure is off-loaded from the classical computer 220 onto the quantum computer 250. In particular, each iteration of the optimisation procedure calls the procedure implemented on the quantum computer to perform a computation, and the iterations are repeated until an optimisation, e.g. minimisation has been achieved. By way of example, each iteration may determine an energy for a quantum system given a set of one or more parameter values, and the optimisation seeks to identify the set of parameter values that produce the lowest energy for the system, this then corresponding to the ground state.

As described herein, a system and method are disclosed for providing a quantum circuit. The method is typically implemented by running compiler 220, whereby the compiler is a computer program comprising program instructions that when executed on a computing device causes the computing device to perform such a method. The compiler may be provided on a suitable storage medium such as described below for loading into the memory for execution by a processor. The system is typically implemented by a combination of the compiler 220 and the computer 210 and hence may represent a combination of hardware and software. The hardware (machine) may comprise a standard, general-purpose computing device, or in some implementations, the hardware (computing device or system) may include more specialised components. The software generally comprises the compiler 220 and an environment (operating system etc.) for running the compiler. The program instructions of the compiler 220 are typically loaded into memory of the computer 210 for execution by one or more processors to cause the computer to perform the method of FIG. 10. The computer program may be stored in a non-transitory medium prior to loading into memory, for example, on flash memory, a hard disk drive, etc.

The approach described herein may include three main steps.

(1) perform macroscopic term sequencing for the circuit using Pauli strings. This sequencing is equivalent to a known problem in graph theory called the colouring problem. A popular greedy algorithm may be used to approximate the solution to this problem ([116], [20]). This term sequencing supports the following two steps.

(2) convert the Pauli strings into phase gadgets. This conversion is called diagonalisation [22].

(3) convert the phase gadgets into gates which can be run natively on a quantum computer using the phase polynomial formalism [9]. This conversion can be performed efficiently using a heuristic known as GraySynth [8].

Unlike many previous compilation strategies for chemistry circuits, the present approach is agnostic to many problem specifics, such as qubit encoding, basis set and molecule of choice. The present approach there provides a generic compilation strategy for the UCC ansatz.

Indeed, the present compilation strategy may be utilised beyond the UCC ansatz. One example of such a further application is for QAOA (Quantum Approximate Optimization Algorithm), see [109]. This application is also based on a Trotterized Hamiltonian (as for the UCC ansatz), and is used for general combinatorial optimisation problems: examples include supply-line optimization (related to the travelling salesman problem), and register allocation & job scheduling ([110]).

Various implementations and examples have been disclosed herein. It will be appreciated that these implementations and examples are not intended to be exhaustive, and the skilled person will be aware of many potential variations and modifications of these implementations and examples that fall within the scope of the present disclosure. It will also be understood that features of particular implementations and examples can typically be incorporated into other implementations and examples (unless the context clearly indicates to the contrary). In summary, the various implementations and examples herein are disclosed by way of illustration rather than limitation, and the scope of the present invention is defined in the appended claims.

REFERENCES

[1] *Networkx Greedy Color*. Available at https://networkx.github.io/documentation/stable/reference/algorithms/generated/networkx.algorithms.coloring.greedy_color.html.

[2] S. Aaronson & D Gottesman (2004): *Improved Simulation of Stabilizer Circuits*. Phys. Rev. A 70(052328), doi:10.1103/PhysRevA.70.052328.

[3] Yunseong Nam et al. (2019): *Ground-state energy estimation of the water molecule on a trapped ionquantum computer*. arXiv.org.

[4] M. Amy, D. Maslov, M. Mosca & M. Roetteler (2013): *A Meet-in-the-Middle Algorithm for Fast Synthesis of Depth-Optimal Quantum Circuits*. IEEE Transactions on Computer-Aided Design of Integrated Circuits and Systems 32(6), pp. 818-830, doi:10.1109/tcad.2013.2244643. Available at http://dx.doi.org/10.1109/tcad.2013.2244643.

[5] M. Amy, D. Maslov, M. Mosca & M. Roetteler (2013): *A Meet-in-the-Middle Algorithm for Fast Synthesis of Depth-Optimal Quantum Circuits*. IEEE Transactions on Computer-Aided Design of Integrated Circuits and Systems 32(6), pp. 818-830, doi:10.1109/TCAD.2013.2244643.

[6] Matthew Amy (2020): *Personal correspondence*.

[7] Matthew Amy, Parsiad Azimzadeh & Michele Mosca (2018): *On the controlled-NOT complexity of controlled-NOT-phase circuits*. Quantum Science and Technology 4(1), p. 015002, doi:10.1088/2058-9565/aad8ca.

[8] Matthew Amy & Vlad Gheorghiu (2019): *staq—A full-stack quantum processing toolkit*. arXiv.org.

[9] Matthew Amy, Dmitri Maslov & Michele Mosca (2014): *Polynomial-Time T-Depth Optimization of Clifford+T Circuits Via Matroid Partitioning*. IEEE Transactions on Computer-Aided Design of Integrated Circuits and Systems 33(10), pp. 1476-1489, doi:10.1109/TCAD.2014.2341953.

[10] Frank Arute, Kunal Arya, Ryan Babbush, Dave Bacon, Joseph C. Bardin, Rami Barends, Rupak Biswas, Sergio Boixo, Fernando G. S. L. Brandao, David A. Buell, Brian Burkett, Yu Chen, Zijun Chen, Ben Chiaro, Roberto Collins, William Courtney, Andrew Dunsworth, Edward Farhi, Brooks Foxen, Austin Fowler, Craig Gidney, Marissa Giustina, Rob Graff, Keith Guerin, Steve Habegger, Matthew P. Harrigan, Michael J. Hartmann, Alan Ho, Markus Hoffmann, Trent Huang, Travis S. Humble, Sergei V. Isakov, Evan Jeffrey, Zhang Jiang, Dvir Kafri, Kostyantyn Kechedzhi, Julian Kelly, Paul V. Klimov, Sergey Knysh, Alexander Korotkov, Fedor Kostritsa, David Landhuis, Mike Lindmark, Erik Lucero, Dmitry Lyakh, Salvatore Mandra, Jarrod R. McClean, Matthew McEwen, Anthony Megrant, Xiao Mi, Kristel Michielsen, Masoud Mohseni, Josh Mutus, Ofer Naaman, Matthew Neeley, Charles Neill, Murphy Yuezhen Niu, Eric Ostby, Andre Petukhov, John C. Platt, Chris Quintana, Eleanor G. Rieffel, Pedram Roushan, Nicholas C. Rubin, Daniel Sank, Kevin J. Satzinger, Vadim Smelyanskiy, Kevin J. Sung, Matthew D. Trevithick, Amit Vainsencher, Benjamin Villalonga, Theodore White, Z. Jamie Yao, Ping Yeh, Adam Zalcman, Hartmut Neven &John M. Martinis (2019): *Quantum supremacy using a programmable superconducting processor*. Nature 574(7779), pp. 505-510, doi:10.1038/541586-019-1666-5.

[11] Niel de Beaudrap, Xiaoning Bian & Quanlong Wang (2019): *Techniques to reduce_/4-parity phase circuits, motivated by the ZX calculus*. arXiv.org.

[12] Andrew M. Childs, Eddie Schoute & Cem M. Unsal (2019): *Circuit Transformations for Quantum Architectures*. In Wim van Dam & Laura Mancinska, editors: 14th Conference on the Theory of Quantum Computation, Communication and Cryptography (TQC 2019), Leibniz International Proceedings in Informatics (LIPIcs) 135, pp. 3:1-3:24, doi:10.4230/LIPIcs.TQC.2019.3. Available at http://drops.dagstuhl.de/opus/volltexte/2019/10395.

[13] Andrew M. Childs, Yuan Su, Minh C. Tran, Nathan Wiebe & Shuchen Zhu (2019): *A Theory of Trotter Error*. arXiv.org.

[14] Bob Coecke & Ross Duncan (2011): *Interacting Quantum Observables: Categorical Algebra and Diagrammatics*. New J. Phys 13(043016), doi:10.1088/1367-2630/13/4/043016. Available at http://iopscience.iop.org/1367-2630/13/4/043016/.

[15] Bob Coecke & Aleks Kissinger (2017): *Picturing Quantum Processes: A First Course in Quantum Theory and Diagrammatic Reasoning*. Cambridge University Press.

[16] Alexander Cowtan, Silas Dilkes, Ross Duncan, Alexandre Krajenbrink, Will Simmons & Seyon Sivarajah (2019): *On the qubit routing problem*. In Wim van Dam & Laura Mancinska, editors: 14th Conference on the Theory of Quantum Computation, Communication and Cryptography (TQC 2019), Leibniz International Proceedings in Informatics (LIPIcs) 135, pp. 5:1-5:32, doi:10.4230/LIPIcs.TQC.2019.5. Available at http://drops.dagstuhl.de/opus/volltexte/2019/10397.

[17] Alexander Cowtan, Silas Dilkes, Ross Duncan, Will Simmons & Seyon Sivarajah (2019): *Phase Gadget Synthesis for Shallow Circuits*. In: Proceedings of QPL2019 (to appear).

[18] Ophelia Crawford, Barnaby van Straaten, Daochen Wang, Thomas Parks, Earl Campbell & Stephen Brierley (2019): *Efficient quantum measurement of Pauli operators*. arXiv.org.

[19] Andrew Fagan & Ross Duncan (2019): *Optimising Clifford Circuits with Quantomatic*. In Peter Selinger & Giulio Chiribella, editors: Proceedings of the 15th International Conference on Quantum Physics and Logic, Halifax, Canada, 3-7th June 2018, Electronic Proceedings in Theoretical Computer Science 287, Open Publishing Association, pp. 85-105, doi:10.4204/EPTCS.287.5.

[20] Kaiwen Gui, Teague Tomesh, Pranav Gokhale, Yunong Shi, Frederic T. Chong, Margaret Martonosi & Martin Suchara (2020): *Term Grouping and Travelling Salesperson for Digital Quantum Simulation*. arXiv.org.

[21] Matthew B. Hastings, Dave Wecker, Bela Bauer & Matthias Troyer (2014): *Improving Quantum Algorithms for Quantum Chemistry*. Quantum Information and Computation 15.

[22] Andrew Jena, Scott Genin & Michele Mosca (2019): *Pauli Partitioning with Respect to Gate Sets*. arXiv.org.

[23] Aleks Kissinger & Arianne Meijer van de Griend (2020): *CNOT circuit extraction for topologically constrained quantum memories*. Quantum Information and Computation. To appear.

[24] Aleks Kissinger & John van de Wetering (2019): *Reducing T-count with the ZX-calculus*. arXiv.org.

[25] Vadym Kliuchnikov & Dmitri Maslov (2013): *Optimization of Clifford circuits*. Phys. Rev. A 88, p. 052307, doi:10.1103/PhysRevA.88.052307. Available at https://link.aps.org/doi/10.1103/PhysRevA.88.052307.

[26] Lingling Lao, Daniel M. Manzano, Hans van Someren, Imran Ashraf & Carmen G. Almudever (2019): *Mapping of quantum circuits onto NISQ superconducting processors*. arXiv.org.

[27] Joonho Lee, William J. Huggins, Martin Head-Gordon & K. Birgitta Whaley (2019): *Generalized Unitary Coupled Cluster Wave functions for Quantum Computation*. Journal of Chemical Theory and Computation 15(1), pp. 311-324, doi:10.1021/acs.jctc.8b01004. Available at https://doi.org/10.1021/acs.jctc.8b01004.

[28] Daniel Litinski (2019): *Magic State Distillation: Not as Costly as You Think*. Quantum 3, p. 205, doi:10.22331/q-2019-12-02-205. Available at http://dx.doi.org/10.22331/q-2019-12-02-205.

[29] Seth Lloyd (1996): *Universal Quantum Simulators.* Science 273(5278), pp. 1073-1078, doi:10.1126/science.273.5278.1073.

[30] Dmitri Maslov & Martin Roetteler (2017): *Shorter stabilizer circuits via Bruhat decomposition and quantum circuit transformations.* IEEE Transactions on Information Theory (7), pp. 4729-4738, doi:10.1109/TIT.2018.2825602.

[31] Jarrod R McClean, Jonathan Romero, Ryan Babbush & Alan Aspuru-Guzik (2016): *The theory of variational hybrid quantum-classical algorithms.* New Journal of Physics 18(2), p. 023023, doi:10.1088/1367-2630/18/2/023023. Available at http://stacks.iop.org/1367-2630/18/i=2/a=023023.

[32] Yunseong Nam, Neil J. Ross, Yuan Su, Andrew M. Childs & Dmitri Maslov (2018): *Automated optimization of large quantum circuits with continuous parameters.* npj Quantum Information 4(1), p. 23, doi:10.1038/s41534-018-0072-4. Available at https://doi.org/10.1038/s41534-018-0072-4.

[33] Beatrice Nash, Vlad Gheorghiu & Michele Mosca (2019): *Quantum circuit optimizations for NISQ architectures.* arXiv.org.

[34] John Preskill (2018): *Quantum Computing in the NISQ era and beyond.* Quantum 2, p. 79, doi:10.22331/q-2018-08-06-79. Available at https://doi.org/10.22331/q-2018-08-06-79.

[35] Jonathan Romero, Ryan Babbush, Jarrod R McClean, Cornelius Hempel, Peter J Love & Alan Aspuru-Guzik (2018): *Strategies for quantum computing molecular energies using the unitary coupled cluster ansatz.* Quantum Science and Technology 4(1), p. 014008, doi:10.1088/2058-9565/aad3e4. Available at https://iopscience.iop.org/article/10.1088/2058-9565/aad3e4.

[36] Mark Steudtner & Stephanie Wehner (2018): *Fermion-to-qubit mappings with varying resource requirements for quantum simulation.* New Journal of Physics 20(6), p. 063010, doi:10.1088/1367-2630/aac54f. Available at https://iopscience.iop.org/article/10.1088/1367-263.

[37] Dave Wecker, Matthew B. Hastings & Matthias Troyer (2015): *Progress towards practical quantum variational algorithms.* Phys. Rev. A 92, p. 042303, doi:10.1103/PhysRevA.92.042303. Available at https://link.aps.org/doi/10.1103/PhysRevA.92.042303.

[38] K. Wright, K. M. Beck, S. Debnath, J. M. Amini, Y. Nam, N. Grzesiak, J. S. Chen, N. C. Pisenti, M. Chmielewski, C. Collins, K. M. Hudek, J. Mizrahi, J. D. Wong-Campos, S. Allen, J. Apisdorf, P. Solomon, M. Williams, A. M. Ducore, A. Blinov, S. M. Kreikemeier, V. Chaplin, M. Keesan, C. Monroe &J. Kim (2019): *Benchmarking an 11-qubit quantum computer.* Nature Communications 10(1), p. 5464, doi:10.1038/s41467-019-13534-2.

[39] Bujiao Wu, Xiaoyu He, Shuai Yang, Lifu Shou, Guojing Tian, Jialin Zhang & Xiaoming Sun (2019): *Optimization of CNOT circuits on topological superconducting processors.* arXiv.org.

[40] Andrew Zhao, Andrew Tranter, William M. Kirby, Shu Fay Ung, Akimasa Miyake & Peter Love (2019): *Measurement reduction in variational quantum algorithms.* arXiv.org.

[41] Alwin Zulehner, Alexandru Paler & Robert Wille (2017): *An Efficient Methodology for Mapping Quantum Circuits to the IBM QX Architectures.* arXiv.org.0/aac54f.

https://quantaggle.com/algorithms/algorithm/#VQE
https://quantaggle.com/algorithms/ansatz/#UCC
https://cqcl.githubio/pytket/build/html/index.html
https://en.wikipedia.org/wiki/Clifford_gates
https://en.wikipedia.org/wiki/Basis_set_%28chemistry %29
https://arxiv.org/pdf/1906.01734.pdf
https://en.wikipedia.org/wiki/Pauli_matrices
https://qiskit.org/
https://arxiv.org/abs/1709.03489
https://www.martincarlisle.com/publications/kcoloring.pdf
https://arxiv.org/abs/1910.04735
https://arxiv.org/abs/cond-mat/9510145
https://www.cond-mat.de/events/correl16/manuscripts/scalettar.pdf
http://aliramadhan.me/files/jaynes-cummings-model.pdf
https://arxiv.org/abs/nucl-th/0308088
https://networkx.github.io/documentation/stable/reference/algorithms/coloring.html
https://arxiv.org/abs/1704.05018

The invention claimed is:

1. A computer-implemented method of generating a quantum circuit from a Unitary Coupled Cluster (UCC) ansatz which represents an excitation of a reference state by a parameterised operator including excitation operators, the UCC ansatz including multi-qubit Pauli operators, referred to as Pauli strings, determined from each excitation operator, the method comprising:
    partitioning the Pauli strings into mutually commuting sets and sequencing the Pauli strings by set;
    generating Pauli gadgets from the Pauli strings by Trotterization, wherein the Pauli gadgets have the same sequencing by set as the Pauli strings;
    diagonalising each set of Pauli gadgets to convert the Pauli gadgets into phase gadgets;
    transforming the phase gadgets into one- and two-qubit native gates to generate the quantum circuit.

2. The method of claim 1, wherein partitioning the Pauli strings into mutually commuting sets seeks to minimise the number of sets.

3. The method of claim 1, wherein the partitioning the Pauli strings comprises partitioning the Pauli strings using a graph colouring algorithm.

4. The method of claim 1, wherein a phase gadget is a Pauli gadget comprising only Z and I letters.

5. The method of claim 1, wherein each set of Pauli gadgets is diagonalised using a Clifford circuit.

6. The method of claim 5, wherein each set of Pauli gadgets is represented as: (i) a Clifford circuit; (ii) a set of phase gadgets, and (iii) an inverse Clifford circuit.

7. The method of claim 6, wherein the Clifford circuits transform between an original basis of the Pauli gadgets and a new basis in which the Pauli gadgets are represented by a corresponding set of phase gadgets.

8. The method of a claim 1, in which for two qubits i and j, and S being a set of m mutually commuting Pauli gadgets and $\sigma_{kI}$ a Pauli letter on qubit k from Pauli gadget I, qubit i or j is diagonalised by conjugating with at most one entangling gate and two single-qubit Clifford gates on each side of S between qubits i and j, providing:

$$\exists A,B \in \{X,Y,Z\} s.t. \forall l \in \{1,\ldots,m\}, \sigma_{il}\{I,A\} \Leftrightarrow \sigma_{jl} \in \{I,B\}$$

9. The method of claim 8, wherein if the proviso of claim 8 is not satisfied, the diagonalisation is performed by:
    finding a Pauli string with the lowest weight;
    conjugating the Pauli gadget corresponding to the Pauli string with the lowest weight with a single-qubit Clifford gate and entangling gates; and
    commuting the Clifford gates through the rest of the Pauli gadgets until all the Clifford gates are outside the adjacent Pauli gadgets.

10. The method of claim 1, wherein transforming the phase gadgets into one- and two-qubit native gates to generate the quantum circuit includes using phase polynomial formalism.

11. The method of claim 10, wherein transforming the phase gadgets by using the phase polynomial formalism includes using a GraySynth procedure.

12. The method of claim 1, further comprising:
performing Clifford peephole optimisation by finding patterns of two-qubit Clifford circuits; and
replacing the found patterns of two-qubit Clifford circuits with equivalent circuits having lower counts of entangling gates.

13. The method of claim 1, wherein the method reduces the count and depth of entangling gates of the quantum circuit relative to a naïve synthesis of the quantum circuit from the Pauli strings.

14. The method of claim 1, wherein the UCC corresponds to a molecular structure.

15. The method of claim 1, wherein the UCC corresponds to a quantum system which has a Hamiltonian which is subject to Trotterization.

16. A system comprising at least one processor and a compiler configured to run on the processor to generate a quantum circuit from a Unitary Coupled Cluster (UCC) ansatz which represents an excitation of a reference state by a parameterised operator including excitation operators, the UCC ansatz including multi-qubit Pauli operators, referred to as Pauli strings, determined from each excitation operator, the compiler being configured to: partition the Pauli strings into mutually commuting sets and sequencing the Pauli strings by set;
generate Pauli gadgets from the Pauli strings by Trotterization, wherein the Pauli gadgets have the same sequencing by set as the Pauli strings;
diagonalise each set of Pauli gadgets to convert the Pauli gadgets into phase gadgets; and
transform the phase gadgets into one- and two-qubit native gates to generate the quantum circuit.

17. A computer-implemented method of generating a quantum circuit from a Hamiltonian using a parameterised operator including excitation operators to represent an excitation of a reference state, wherein multi-qubit Pauli operators, referred to as Pauli strings, are determined from each excitation operator, the method comprising:
partitioning the Pauli strings into mutually commuting sets and sequencing the Pauli strings by set;
generating Pauli gadgets from the Pauli strings by Trotterization, wherein the Pauli gadgets have the same sequencing by set as the Pauli strings;
diagonalising each set of Pauli gadgets to convert the Pauli gadgets into phase gadgets; and
transforming the phase gadgets into one- and two-qubit native gates to generate the quantum circuit.

18. The method of claim 17, wherein the Hamiltonian corresponds to a Quantum Approximate Optimization Algorithm.

19. A system comprising at least one processor and a compiler configured to run on the processor to generate a quantum circuit from a Hamiltonian using a parameterised operator including excitation operators to represent an excitation of a reference state, wherein multi-qubit Pauli operators, referred to as Pauli strings, are determined from each excitation operator, the compiler being configured to:
partition the Pauli strings into mutually commuting sets and sequencing the Pauli strings by set;
generate Pauli gadgets from the Pauli strings by Trotterization, wherein the Pauli gadgets have the same sequencing by set as the Pauli strings;
diagonalise each set of Pauli gadgets to convert the Pauli gadgets into phase gadgets; and
transform the phase gadgets into one- and two-qubit native gates to generate the quantum circuit.

\* \* \* \* \*